(12) United States Patent
Garg et al.

(10) Patent No.: US 7,802,074 B2
(45) Date of Patent: *Sep. 21, 2010

(54) SUPERSCALAR RISC INSTRUCTION SCHEDULING

(76) Inventors: Sanjiv Garg, 46820 Sentinel Dr., Fremont, CA (US) 94539; Kevin Ray Iadonato, 678 Galleon Ct., San Jose, CA (US) 95133; Le Trong Nguyen, 15096 Danielle Pl., Monte Sereno, CA (US) 95030; Johannes Wang, 25 King St., Redwood City, CA (US) 94062

( * ) Notice: Subject to any disclaimer, the term of this patent is extended or adjusted under 35 U.S.C. 154(b) by 662 days.

This patent is subject to a terminal disclaimer.

(21) Appl. No.: 11/730,566

(22) Filed: Apr. 2, 2007

(65) Prior Publication Data

US 2008/0059770 A1 Mar. 6, 2008

Related U.S. Application Data

(63) Continuation of application No. 11/252,820, filed on Oct. 19, 2005, now abandoned, which is a continuation of application No. 10/086,197, filed on Mar. 1, 2002, now Pat. No. 7,051,187, which is a continuation of application No. 09/906,099, filed on Jul. 17, 2001, now abandoned, which is a continuation of application No. 09/329,354, filed on Jun. 10, 1999, now Pat. No. 6,289,433, which is a continuation of application No. 08/990,414, filed on Dec. 15, 1997, now Pat. No. 5,974,526, which is a continuation of application No. 08/594,401, filed on Jan. 31, 1996, now Pat. No. 5,737,624, which is a continuation of application No. 08/219,425, filed on Mar. 29, 1994, now Pat. No. 5,497,499, which is a continuation of application No. 07/860,719, filed on Mar. 31, 1992, now abandoned.

(51) Int. Cl.
*G06F 9/38* (2006.01)

(52) U.S. Cl. ............... 712/23; 712/216; 712/218
(58) Field of Classification Search ............... 712/23, 712/218, 217, 216
See application file for complete search history.

(56) References Cited

U.S. PATENT DOCUMENTS 3,346,851 A 10/1967 Thornton et al.

(Continued)

FOREIGN PATENT DOCUMENTS

EP 0 170 284 2/1986

(Continued)

OTHER PUBLICATIONS

Order Granting Request for *Ex Parte* Reexamination, mailed Jun. 12, 2007 in U.S. Appl. No. 90/008,585, 19 pages.

(Continued)

*Primary Examiner*—Larry Donaghue
(74) *Attorney, Agent, or Firm*—Sterne, Kessler, Goldstein & Fox P.L.L.C.

(57) ABSTRACT

A register renaming system for out-of-order execution of a set of reduced instruction set computer instructions having addressable source and destination register fields, adapted for use in a computer having an instruction execution unit with a register file accessed by read address ports and for storing instruction operands. A data dependance check circuit is included for determining data dependencies between the instructions. A tag assignment circuit generates one or more tags to specify the location of operands, based on the data dependencies determined by the data dependance check circuit. A set of register file port multiplexers select the tags generated by the tag assignment circuit and pass the tags onto the read address ports of the register file for storing execution results.

18 Claims, 9 Drawing Sheets

U.S. PATENT DOCUMENTS

| | | | |
|---|---|---|---|
| 3,718,912 A | 2/1973 | Hasbrouck et al. |
| 3,771,138 A | 11/1973 | Celtruda et al. |
| 3,789,365 A | 1/1974 | Jen et al. |
| 3,913,074 A | 10/1975 | Homberg et al. |
| 4,034,349 A | 7/1977 | Monaco et al. |
| 4,128,880 A | 12/1978 | Cray, Jr. |
| 4,200,927 A | 4/1980 | Hughes et al. |
| 4,212,076 A | 7/1980 | Conners |
| 4,228,495 A | 10/1980 | Bernhard et al. |
| 4,296,470 A | 10/1981 | Fairchild et al. |
| 4,315,308 A | 2/1982 | Jackson |
| 4,315,314 A | 2/1982 | Russo |
| 4,410,939 A | 10/1983 | Kawakami |
| 4,434,461 A | 2/1984 | Puhl |
| 4,459,657 A | 7/1984 | Murao |
| 4,476,525 A | 10/1984 | Ishii |
| 4,482,950 A | 11/1984 | Dshkhunian et al. |
| 4,498,134 A | 2/1985 | Hansen et al. |
| 4,500,963 A | 2/1985 | Smith et al. |
| 4,532,598 A | 7/1985 | Shibyama et al. |
| 4,561,051 A | 12/1985 | Rodman |
| 4,574,349 A | 3/1986 | Rechtschaffen |
| 4,594,655 A | 6/1986 | Hao et al. |
| 4,597,054 A | 6/1986 | Lockwood et al. |
| 4,613,941 A | 9/1986 | Smith et al. |
| 4,626,989 A | 12/1986 | Torii |
| 4,644,466 A | 2/1987 | Saito |
| 4,648,045 A | 3/1987 | Demetrescu |
| 4,675,806 A | 6/1987 | Uchida |
| 4,714,994 A | 12/1987 | Oklobdzija et al. |
| 4,719,569 A | 1/1988 | Ludemann et al. |
| 4,722,049 A | 1/1988 | Lahti |
| 4,752,873 A | 6/1988 | Shonai et al. |
| 4,758,948 A | 7/1988 | May et al. |
| 4,766,566 A | 8/1988 | Chuang |
| 4,775,927 A | 10/1988 | Hester et al. |
| 4,791,607 A | 12/1988 | Igarashi et al. |
| 4,807,115 A | 2/1989 | Torng |
| 4,811,208 A | 3/1989 | Myers et al. |
| 4,814,978 A | 3/1989 | Dennis |
| 4,823,201 A | 4/1989 | Simon et al. |
| 4,829,467 A | 5/1989 | Ogata |
| 4,833,599 A | 5/1989 | Colwell et al. |
| 4,841,453 A | 6/1989 | Finlay et al. |
| 4,858,105 A | 8/1989 | Kuriyama et al. |
| 4,858,116 A | 8/1989 | Gillett, Jr. et al. |
| 4,881,167 A | 11/1989 | Sasaki et al. |
| 4,897,810 A | 1/1990 | Nix |
| 4,901,228 A | 2/1990 | Kodama |
| 4,901,233 A | 2/1990 | Liptay |
| 4,903,196 A | 2/1990 | Pomerene et al. |
| 4,916,604 A | 4/1990 | Yamamoto et al. |
| 4,924,376 A | 5/1990 | Ooi |
| 4,926,323 A | 5/1990 | Baror et al. |
| 4,928,226 A | 5/1990 | Karnada et al. |
| 4,942,525 A | 7/1990 | Shintani et al. |
| 4,945,479 A | 7/1990 | Rusterholz et al. |
| 4,964,057 A | 10/1990 | Yabe |
| 4,974,154 A | 11/1990 | Matsuo |
| 4,974,155 A | 11/1990 | Dulong et al. |
| 4,980,817 A | 12/1990 | Fossum et al. |
| 4,985,825 A | 1/1991 | Webb, Jr. et al. |
| 4,991,078 A | 2/1991 | Wilhelm et al. |
| 4,991,081 A | 2/1991 | Bosshart |
| 4,992,938 A | 2/1991 | Cocke et al. |
| 5,003,462 A | 3/1991 | Blaner et al. |
| 5,032,985 A | 7/1991 | Curran |
| 5,051,925 A | 9/1991 | Kadono et al. |
| 5,067,069 A | 11/1991 | Fite et al. |
| 5,072,364 A | 12/1991 | Jardine et al. |
| 5,089,951 A | 2/1992 | Iijima |
| 5,093,783 A | 3/1992 | Kitada |
| 5,097,409 A | 3/1992 | Schwartz et al. |
| 5,101,341 A | 3/1992 | Circello et al. |
| 5,109,495 A | 4/1992 | Fite et al. |
| 5,119,485 A | 6/1992 | Ledbetter, Jr. et al. |
| 5,120,083 A | 6/1992 | Stine |
| 5,125,083 A | 6/1992 | Fite et al. |
| 5,125,092 A | 6/1992 | Prener |
| 5,127,091 A | 6/1992 | Boufarah et al. |
| 5,129,067 A | 7/1992 | Johnson |
| 5,133,074 A | 7/1992 | Chou |
| 5,133,077 A | 7/1992 | Karne et al. |
| 5,134,561 A | 7/1992 | Liptay |
| 5,136,697 A | 8/1992 | Johnson |
| 5,140,682 A | 8/1992 | Okura et al. |
| 5,142,633 A | 8/1992 | Murray et al. |
| 5,142,634 A | 8/1992 | Fite et al. |
| 5,148,533 A | 9/1992 | Joyce et al. |
| 5,148,536 A | 9/1992 | Witek et al. |
| 5,150,309 A | 9/1992 | Shaw et al. |
| 5,155,843 A | 10/1992 | Stamm et al. |
| 5,167,026 A | 11/1992 | Murray et al. |
| 5,167,035 A | 11/1992 | Mann et al. |
| 5,179,530 A | 1/1993 | Genusov et al. |
| 5,179,673 A | 1/1993 | Steely, Jr. et al. |
| 5,179,689 A | 1/1993 | Leach et al. |
| 5,185,872 A | 2/1993 | Arnold et al. |
| 5,185,878 A | 2/1993 | Baror et al. |
| 5,187,796 A | 2/1993 | Wang et al. |
| 5,193,157 A | 3/1993 | Barbour et al. |
| 5,197,132 A | 3/1993 | Steely, Jr. et al. |
| 5,197,136 A | 3/1993 | Kimura et al. |
| 5,201,056 A | 4/1993 | Daniel et al. |
| 5,214,763 A | 5/1993 | Blaner et al. |
| 5,214,786 A | 5/1993 | Watanabe et al. |
| 5,222,223 A | 6/1993 | Webb, Jr. et al. |
| 5,222,240 A | 6/1993 | Patel |
| 5,222,244 A | 6/1993 | Carbine et al. |
| 5,226,125 A | 7/1993 | Balmer et al. |
| 5,226,126 A | 7/1993 | McFarland et al. |
| 5,226,166 A | 7/1993 | Ishida et al. |
| 5,226,170 A | 7/1993 | Rubinfeld |
| 5,228,136 A | 7/1993 | Shimizu et al. |
| 5,230,068 A | 7/1993 | Van Dyke et al. |
| 5,233,694 A | 8/1993 | Hotta et al. |
| 5,237,666 A | 8/1993 | Suzuki et al. |
| 5,241,636 A | 8/1993 | Kohn |
| 5,249,286 A | 9/1993 | Alpert et al. |
| 5,251,306 A | 10/1993 | Tran |
| 5,255,384 A | 10/1993 | Sachs et al. |
| 5,261,057 A | 11/1993 | Coyle et al. |
| 5,261,071 A | 11/1993 | Lyon |
| 5,276,899 A | 1/1994 | Neches |
| 5,278,963 A | 1/1994 | Hattersley et al. |
| H1291 H | 2/1994 | Hinton et al. |
| 5,283,903 A | 2/1994 | Uehara |
| 5,285,527 A | 2/1994 | Crick et al. |
| 5,287,465 A | 2/1994 | Kurosawa et al. |
| 5,287,467 A | 2/1994 | Blaner et al. |
| 5,291,615 A | 3/1994 | Okamoto |
| 5,293,500 A | 3/1994 | Ishida et al. |
| 5,301,278 A | 4/1994 | Bowater et al. |
| 5,303,362 A | 4/1994 | Butts, Jr. et al. |
| 5,303,382 A | 4/1994 | Buch et al. |
| 5,317,720 A | 5/1994 | Stamm et al. |
| 5,345,569 A | 9/1994 | Tran |
| 5,355,457 A | 10/1994 | Shebanow et al. |
| 5,355,460 A | 10/1994 | Eickemeyer et al. |
| 5,367,660 A | 11/1994 | Gat et al. |
| 5,371,684 A | 12/1994 | Iadonato et al. |
| 5,377,339 A | 12/1994 | Saito et al. |
| 5,388,215 A | 2/1995 | Baker et al. |
| 5,390,355 A | 2/1995 | Horst |

| | | | | | | |
|---|---|---|---|---|---|---|
| 5,394,351 | A | 2/1995 | Widigen et al. | 5,689,720 | A | 11/1997 | Nguyen et al. |
| 5,394,515 | A | 2/1995 | Lentz et al. | 5,708,841 | A | 1/1998 | Popescu et al. |
| 5,394,529 | A | 2/1995 | Brown, III et al. | 5,734,584 | A | 3/1998 | Iadonato et al. |
| 5,398,330 | A | 3/1995 | Johnson | 5,737,624 | A | 4/1998 | Garg et al. |
| 5,404,470 | A | 4/1995 | Miyake | 5,745,375 | A | 4/1998 | Reinhardt et al. |
| 5,404,472 | A | 4/1995 | Kurosawa et al. | 5,754,800 | A | 5/1998 | Lentz et al. |
| 5,430,884 | A | 7/1995 | Beard et al. | 5,768,575 | A | 6/1998 | McFarland et al. |
| 5,430,888 | A | 7/1995 | Witek et al. | 5,778,210 | A | 7/1998 | Henstrom et al. |
| 5,436,869 | A | 7/1995 | Yoshida | 5,797,025 | A | 8/1998 | Popescu et al. |
| 5,440,752 | A | 8/1995 | Lentz et al. | 5,802,605 | A | 9/1998 | Alpert et al. |
| 5,442,757 | A | 8/1995 | McFarland et al. | 5,809,276 | A | 9/1998 | Deosaran et al. |
| 5,446,912 | A | 8/1995 | Colwell et al. | 5,819,101 | A | 10/1998 | Peleg et al. |
| 5,448,705 | A | 9/1995 | Nguyen et al. | 5,826,055 | A | 10/1998 | Wang et al. |
| 5,452,426 | A | 9/1995 | Papworth et al. | 5,831,871 | A | 11/1998 | Iadonato et al. |
| 5,461,715 | A | 10/1995 | Matsuo et al. | 5,832,205 | A | 11/1998 | Kelly et al. |
| 5,471,592 | A | 11/1995 | Gove et al. | 5,832,292 | A | 11/1998 | Nguyen et al. |
| 5,473,764 | A | 12/1995 | Chi | 5,832,293 | A | 11/1998 | Popescu et al. |
| 5,481,685 | A | 1/1996 | Nguyen et al. | 5,838,986 | A | 11/1998 | Garg et al. |
| 5,481,734 | A | 1/1996 | Yoshida | 5,881,275 | A | 3/1999 | Peleg et al. |
| 5,487,156 | A | 1/1996 | Popescu et al. | 5,892,963 | A | 4/1999 | Iadonato et al. |
| 5,488,729 | A | 1/1996 | Vegesna et al. | 5,896,542 | A | 4/1999 | Iadonato et al. |
| 5,490,280 | A | 2/1996 | Gupta et al. | 5,941,979 | A | 8/1999 | Lentz et al. |
| 5,493,687 | A | 2/1996 | Garg et al. | 5,961,629 | A | 10/1999 | Nguyen et al. |
| 5,497,499 | A | 3/1996 | Garg et al. | 5,974,526 | A | 10/1999 | Garg et al. |
| 5,524,225 | A | 6/1996 | Kranich | 6,038,653 | A | 3/2000 | Nguyen et al. |
| 5,539,911 | A | 7/1996 | Nguyen et al. | 6,038,654 | A | 3/2000 | Nguyen et al. |
| 5,559,951 | A | 9/1996 | Lentz et al. | 6,044,449 | A | 3/2000 | Garg et al. |
| 5,560,032 | A | 9/1996 | Nguyen et al. | 6,047,348 | A | 4/2000 | Lentz et al. |
| 5,560,035 | A | 9/1996 | Garg et al. | 6,083,274 | A | 7/2000 | Iadonato et al. |
| 5,561,775 | A | 10/1996 | Kurosawa et al. | 6,092,176 | A | 7/2000 | Iadonato et al. |
| 5,561,776 | A | 10/1996 | Popescu et al. | 6,092,181 | A | 7/2000 | Nguyen et al. |
| 5,564,056 | A | 10/1996 | Fetterman et al. | 6,101,594 | A | 8/2000 | Nguyen et al. |
| 5,564,117 | A | 10/1996 | Lentz et al. | 6,128,723 | A | 10/2000 | Nguyen et al. |
| 5,566,385 | A | 10/1996 | Iadonato et al. | 6,131,157 | A | 10/2000 | Wang et al. |
| 5,568,624 | A | 10/1996 | Sites et al. | 6,138,231 | A | 10/2000 | Deosaran et al. |
| 5,574,927 | A | 11/1996 | Scantlin | 6,219,763 | B1 | 4/2001 | Lentz et al. |
| 5,574,935 | A | 11/1996 | Vidwans et al. | 6,249,856 | B1 | 6/2001 | Garg et al. |
| 5,574,941 | A | 11/1996 | Horst | 6,256,720 | B1 | 7/2001 | Nguyen et al. |
| 5,577,200 | A | 11/1996 | Abramson et al. | 6,272,579 | B1 | 8/2001 | Lentz et al. |
| 5,577,217 | A | 11/1996 | Hoyt et al. | 6,272,617 | B1 | 8/2001 | Deosaran et al. |
| 5,584,001 | A | 12/1996 | Hoyt et al. | 6,272,619 | B1 | 8/2001 | Nguyen et al. |
| 5,586,278 | A | 12/1996 | Papworth et al. | 6,282,630 | B1 | 8/2001 | Nguyen et al. |
| 5,590,295 | A | 12/1996 | Deosaran et al. | 6,289,433 | B1 | 9/2001 | Garg et al. |
| 5,592,636 | A | 1/1997 | Popescu et al. | 6,360,309 | B1 | 3/2002 | Iadonato et al. |
| 5,604,865 | A | 2/1997 | Lentz et al. | 6,385,634 | B1 | 5/2002 | Peleg et al. |
| 5,604,877 | A | 2/1997 | Hoyt et al. | 6,401,232 | B1 | 6/2002 | Iadonato et al. |
| 5,604,912 | A | 2/1997 | Iadonato et al. | 6,408,375 | B2 | 6/2002 | Deosaran et al. |
| 5,606,676 | A | 2/1997 | Grochowski et al. | 6,412,064 | B1 | 6/2002 | Wang et al. |
| 5,608,885 | A | 3/1997 | Gupta et al. | 6,418,529 | B1 | 7/2002 | Roussel |
| 5,613,132 | A | 3/1997 | Clift et al. | 6,611,908 | B2 | 8/2003 | Lentz et al. |
| 5,615,126 | A | 3/1997 | Deeley et al. | 6,647,485 | B2 | 11/2003 | Nguyen et al. |
| 5,615,385 | A | 3/1997 | Fetterman et al. | 6,735,685 | B1 | 5/2004 | Senter et al. |
| 5,617,554 | A | 4/1997 | Alpert et al. | 6,757,808 | B2 | 6/2004 | Iadonato et al. |
| 5,619,664 | A | 4/1997 | Glew | 6,775,761 | B2 | 8/2004 | Wang et al. |
| 5,619,668 | A | 4/1997 | Zaidi | 6,782,521 | B2 | 8/2004 | Iadonato et al. |
| 5,623,628 | A | 4/1997 | Brayton et al. | 6,915,412 | B2 | 7/2005 | Nguyen et al. |
| 5,625,788 | A | 4/1997 | Boggs et al. | 6,920,548 | B2 | 7/2005 | Wang et al. |
| 5,625,837 | A | 4/1997 | Popescu et al. | 6,922,772 | B2 | 7/2005 | Deosaran et al. |
| 5,627,983 | A | 5/1997 | Popescu et al. | 6,934,829 | B2 | 8/2005 | Nguyen et al. |
| 5,627,984 | A | 5/1997 | Gupta et al. | 6,941,447 | B2 | 9/2005 | Nguyen et al. |
| 5,627,985 | A | 5/1997 | Fetterman et al. | 6,948,052 | B2 | 9/2005 | Nguyen et al. |
| 5,628,021 | A | 5/1997 | Iadonato et al. | 6,954,844 | B2 | 10/2005 | Lentz et al. |
| 5,630,075 | A | 5/1997 | Joshi et al. | 6,959,375 | B2 | 10/2005 | Nguyen et al. |
| 5,630,083 | A | 5/1997 | Carbine et al. | 6,970,995 | B2 | 11/2005 | Deosaran et al. |
| 5,630,149 | A | 5/1997 | Bluhm | 6,986,024 | B2 | 1/2006 | Nguyen et al. |
| 5,630,157 | A | 5/1997 | Dwyer, III | 7,028,161 | B2 | 4/2006 | Nguyen et al. |
| 5,640,588 | A | 6/1997 | Vegesna et al. | 7,043,624 | B2 | 5/2006 | Iadonato et al. |
| 5,651,125 | A | 7/1997 | Witt et al. | 7,051,187 | B2 | 5/2006 | Garg et al. |
| 5,655,098 | A | 8/1997 | Witt et al. | 7,162,610 | B2 | 1/2007 | Nguyen et al. |
| 5,664,136 | A | 9/1997 | Witt et al. | 7,174,525 | B2 | 2/2007 | Iadonato et al. |
| 5,666,494 | A | 9/1997 | Mote, Jr. | 2001/0034823 | A1 | 10/2001 | Garg et al. |
| 5,682,546 | A | 10/1997 | Garg et al. | 2002/0059508 | A1 | 5/2002 | Lentz et al. |
| 5,689,672 | A | 11/1997 | Witt et al. | 2002/0083300 | A1 | 6/2002 | Deosaran et al. |

| | | | |
|---|---|---|---|
| 2002/0129324 | A1 | 9/2002 | Iadonato et al. |
| 2002/0194456 | A1 | 12/2002 | Deosaran et al. |
| 2003/0056086 | A1 | 3/2003 | Nguyen et al. |
| 2003/0056087 | A1 | 3/2003 | Nguyen et al. |
| 2003/0070060 | A1 | 4/2003 | Nguyen et al. |
| 2003/0079113 | A1 | 4/2003 | Nguyen et al. |
| 2003/0115440 | A1 | 6/2003 | Garg et al. |
| 2004/0024987 | A1 | 2/2004 | Lentz et al. |
| 2004/0054872 | A1 | 3/2004 | Nguyen et al. |
| 2004/0093482 | A1 | 5/2004 | Nguyen et al. |
| 2004/0093483 | A1 | 5/2004 | Nguyen et al. |
| 2004/0093485 | A1 | 5/2004 | Nguyen et al. |
| 2005/0228973 | A1 | 10/2005 | Wang et al. |
| 2006/0020773 | A1 | 1/2006 | Deosaran et al. |
| 2006/0041736 | A1 | 2/2006 | Garg et al. |
| 2006/0064569 | A1 | 3/2006 | Lentz et al. |
| 2006/0123218 | A1 | 6/2006 | Iadonato et al. |
| 2006/0149925 | A1 | 7/2006 | Nguyen et al. |
| 2007/0101103 | A1 | 5/2007 | Nguyen et al. |
| 2007/0106878 | A1 | 5/2007 | Nguyen et al. |
| 2007/0106880 | A1 | 5/2007 | Wang et al. |
| 2007/0113047 | A1 | 5/2007 | Garg et al. |
| 2007/0113214 | A1 | 5/2007 | Iadonato et al. |

FOREIGN PATENT DOCUMENTS

| | | |
|---|---|---|
| EP | 0 213 843 | 3/1987 |
| EP | 0 241 909 | 10/1987 |
| EP | 0 354 585 | 2/1990 |
| EP | 0 378 195 A2 | 7/1990 |
| EP | 0 454 636 | 10/1991 |
| EP | 0 515 166 A1 | 11/1992 |
| EP | 0 533 337 A1 | 3/1993 |
| GB | 2 190 521 | 11/1987 |
| JP | 57-57345 | 4/1982 |
| JP | 60-144830 | 7/1985 |
| JP | 61-40650 | 2/1986 |
| JP | 61-107434 | 5/1986 |
| JP | 62-242243 | 10/1987 |
| JP | 63-192135 | 8/1988 |
| JP | 1-142831 | 6/1989 |
| JP | 1-199233 | 8/1989 |
| JP | 2-048732 | 2/1990 |
| JP | 2-118757 | 5/1990 |
| JP | 2-211534 | 8/1990 |
| JP | 2-224025 | 9/1990 |
| JP | 2-226342 | 9/1990 |
| JP | 3-035324 | 2/1991 |
| JP | 3-218524 | 9/1991 |
| JP | 4-054638 | 2/1992 |
| JP | 4-096132 | 3/1992 |
| JP | 4-503582 | 6/1992 |
| JP | 5-197544 | 8/1993 |
| JP | 6-019707 | 1/1994 |
| WO | WO 88/09035 A2 | 11/1988 |
| WO | WO 91/20031 A1 | 12/1991 |

OTHER PUBLICATIONS

Order Granting Request for *Ex Parte* Reexamination, mailed May 11, 2007 in U.S. Appl. No. 90/008,569, 27 pages.

Order Granting Request for *Ex Parte* Reexamination, mailed Jun. 16, 2007 in U.S. Appl. No. 90/008,644, 35 pages.

8-Bit Embedded Controller Handbook, Intel, 1989, pp. 1-1-1-19 and 3-1-3-37.

Adams et al., "Utilizing low level parallelism in general purpose code: the HARP project," Microprocessors and Microsystems, vol. 29, No. 3 (Oct. 1990).

Albert, AJ, "User Configurable Local Storage Registers," IBM Technical Disclosure Bulletin, pp. 3971-3975 (1976).

Baker, T., "Headroom and Legroom in the 80960 Architecture," COMPCON Spring '90: Thirty-Fifth IEEE Computer Society International Conference, IEEE Computer Society, 1990, pp. 299-306.

Bakoglu et al., "IBM Second-Generation RISC Machine Organization," 1990, IEEE, pp. 173-178.

Birman, M. et al., "Design of a High-Speed Arithmetic Datapath," Proceedings 1988 IEEE International Conference on Computer Design: VLSI in Computers & Processors, IEEE, Oct. 3-5, 1988, pp. 214-216.

Colwell, R. et al., "Architecture and implementation of a VLIW supercomputer," Proc. Of the 1990 Conf. on Supercomputing (1990).

Convex Architecture Handbook, Version 1, Convex Computer Corporation (1984).

Fairchild Semiconductor "Clipper 32-Bit Microprocessor—User's Manual," Prentice-Hall, Inc. (1987).

Findlay, et al., "HARP: A VLIW RISC Processor", Proceeding of 5th Annual European Computer Conference on Advanced Computer Technology, Reliable Systems and Applications, May 16, 1991, pp. 368-372.

Groves, R.D. and Oehler, R., "An IBM Second Generation RISC Processor Architecture," COMPCON 90: 35th IEEE Computer Society International Conference, IEEE, Feb. 26, 1990, pp. 166-172.

Hara et al., "Branch Pipeline of DSNS Superscalar Processor Prototype", Computer Architecture, 86-3, Jan. 24, 1991, pp. 1-8 in Japanese language (with English language translation, 20 pages).

Huang, J.W. et al., "Dynamically Reconfigurable Vectors," IBM Technical Disclosure Bulletin, pp. 3480-3483 (Dec. 1980).

Hunter, C., Series 32000 Programmer's Reference Manual, Prentice-Hall Inc., Englewood Cliffs, NJ, 1987, pp. 2-4, 2-21, 2-23, 6-14 and 6-126.

Hwang, K. et al., "Computer Architecture and Parallel Processing," Pipeline Computers and Vectorization Methods, McGraw Hill, Inc., 1984, pp. 264-280.

Intrater et al., "A Superscalar Microprocessor," IEEE Proceedings of the 17th Convention of Electrical & Electronics Engineers in Israel, pp. 267-270 (Mar. 1991).

Jelemensky, "New Microcomputer Features Advanced Hardware For Real-Time Control Applications," Electro Conference Record, vol. 14, Apr. 11, 1989, Los Angeles, CA, pp. 511-519.

Kanai, T. et al., "A 16-bit Microcomputer μPD70423 for Serial Communication," NEC Research & Development, NEC, vol. 32, No. 3, Jul. 1991, pp. 350-360.

Kogge, P.M., "The Architecture of Pipelined Computers," Static Pipelined Systems Vector Processors, Hemisphere Publishing Corporation, 1981, pp. 167-172.

Lee, Ruby B., "Precision Architecture," Computer, Jan. 1989, pp. 78-91.

Maejima et al., "A 16-bit Microprocessor with Multi-Register Band Architecture," Proc. Fall Joint Computer Conference, pp. 1014-1019 (Nov. 2-6, 1986).

Maly et al., "Memory Chip for 24-Port Global Register File," Custom Integrated Circuits Conference, Proceedings of the IEEE, (May 12, 1991).

Margulis, N., "i860 microprocessor internal architecture," Microprocessors and Microsystems, Butterworth & Co. Ltd., vol. 14, No. 2, pp. 89-96 (Mar. 1990).

McGeady, S., "The i960A Superscalar Implementation of the 80960 Architecture," IEEE, 1990, pp. 232-240.

Melear, "The Design of the 88000 RISC Family," IEEE Micro, vol. 9, No. 2, pp. 26-38 (Apr. 1989).

Miller et al., "Exploiting Large Register Sets," Microprocessors and Microsystems, Butterworth-Heinemann Ltd., vol. 14, No. 6, Jul. 1990, pp. 333-340.

Molnar, K. et al., "A 40 MHz 64-Bit Floating-Point Co-Processor," 1989 IEEE International Solid-State Circuits Conference, IEEE, Feb. 1989, pp. 48, 49 and 287.

Myers et al., The 80960 Microprocessor Architecture, John Wiley & Sons, Inc (1988).

Nakano, H. et al., "A 80 Mflops 64-bit Microprocessor for Parallel Computer," 1991, IEEE, pp. 15.2.1-15.2.4.

Odnert, D. et al., "Architecture and Compiler Enhancements for PA-RISC Workstations," Proceedings from IEEE Compcon, Feb. 25-Mar. 1, 1991, San Francisco, CA, pp. 214-218.

Patent Abstracts of Japan, vol. 010, No. 089, Apr. 1986, & JP, A, 60 225 943 (Hitachi Seisakusho K K) Nov. 11, 1985.

Patterson, D. A. and Séquin, C.H., "A VLSI RISC," Computer, IEEE, vol. 15, No. 9, Sep. 1982, pp. 8-18 and 20-21.

Russell, R. M., "The CRAY-1 Computer System," Association for Computing Machinery, Inc., vol. 21, No. 1, Jan. 1978, pp. 63-72.

Steven, G.B. et al., "HARP: A parallel pipelined RISC processor," Microprocessors and Microsystems, Butterworth & Co. Ltd., vol. 13, No. 9,Nov. 1989, pp. 579-586.

Third-Generation TMS320 User's Guide, Texas Instruments (1988).

Weiss, R., "Third-Generation RISC Processors", On Special Report, Mar. 30, 1992, pp. 96-108.

English Language Abstract for JP Patent Publication No. 1-142831.
English Language Abstract for JP Patent Publication No. 1-199233.
English Language Abstract for JP Patent Publication No. 2-048732.
English Language Abstract for JP Patent Publication No. 2-118757.
English Language Abstract for JP Patent Publication No. 2-211534.
English Language Abstract for JP Patent Publication No. 2-224025.
English Language Abstract for JP Patent Publication No. 2-226342.
English Language Abstract for JP Patent Publication No. 3-035324.
English Language Abstract for JP Patent Publication No. 3-218524.
English Language Abstract for JP Patent Publication No. 4-054638.
English Language Abstract for JP Patent Publication No. 4-096132.
English Language Abstract for JP Patent Publication No. 4-503582.
English Language Abstract for JP Patent Publication No. 5-197544.
English Language Abstract for JP Patent Publication No. 6-019707.
English Language Abstract for JP Patent Publication No. 57-057345.
English Language Abstract for JP Patent Publication No. 60-144830.
English Language Abstract for JP Patent Publication No. 61-40650.
English Language Abstract for JP Patent Publication No. 61-107434.
English Language Abstract for JP Patent Publication No. 62-242243.
English Language Abstract for JP Patent Publication No. 63-192135.

Stipulation of Dismissal, 1 page, dated Jan. 31, 2008, in *Transmeta Corporation v. Intel Corporation*, in the U.S. District Court for the District of Delaware, Case No. 1:06-cv-00633.

Acosta, R. D. et al., "An Instruction Issuing Approach to Enhancing Performance in Multiple Functional Unit Processors," *IEEE Transactions On Computers*, IEEE, vol. C-35, No. 9, Sep. 1986, pp. 815-828.

Agerwala, T. and Cocke, J., *High Performance Reduced Instruction Set Processors*, IBM Research Division, Mar. 31, 1987, pp. 1-61.

Aiken, A. and Nicolau, A., "Perfect Pipelining: A New Loop Parallelization Technique*," *ESOP '88, 2nd European Symposium on Programming*, Springer, ISBN 3-540-19027-9, 1988, pp. 221-235.

Butler, M. and Patt, Y., "An Improved Area-Efficient Register Alias Table for Implementing HPS," University of Michigan, Ann Arbor, Michigan, Jan. 23, 1990, 24 pages.

Butler, M. et al., "Single Instruction Stream Parallelism Is Greater Than Two," *18th Annual International Symposium on Computer Architecture*, vol. 19, No. 3, ACM, May 1991, pp. 276-286.

Charlesworth, A.E., "An Approach to Scientific Array Processing: The Architectural Design of the AP-120B/FPS-164 Family," *Computer*, IEEE, vol. 14, Sep. 1981, pp. 18-27.

Colwell, R.P. et al., "A VLIW Architecture for a Trace Scheduling Compiler," *Proceedings of the 2nd International Conference on Architectural Support for Programming Languages and Operating Systems*, IEEE Computer Society, Oct. 1987, pp. 180-192.

Dwyer, H., III, Ph.D., *A Multiple, Out-of-Order, Instruction Issuing System For Superscalar Processors*, Dissertation for Cornell University, UMI Dissertation Services, Aug. 1991, pp. iii-xvi and 1-249.

Foster, C.C. and Riseman, E.M., "Percolation of Code to Enhance Parallel Dispatching and Execution," *IEEE Transactions On Computers*, IEEE, Dec. 1972, pp. 1411-1415.

Gee, J. et al., "The Implementation of Prolog via VAX 8600 Microcode," *International Symposium on Microarchitecture: Proceedings of the 19th Annual Workshop on Microprogramming*, ACM, 1986, pp. 68-74.

Goodman, J.R. and Hsu, W., "Code Scheduling and Register Allocation in Large Basic Blocks," *Proceedings of the 2nd International Conference on Supercomputing*, ACM, 1988, pp. 442-452.

Gross, T.R. and Hennessy, J.L., "Optimizing Delayed Branches," *Proceedings of the 5th Annual Workshop on Microprogramming*, IEEE & ACM, Oct. 5-7, 1982, pp. 114-120.

Groves, R.D. and Oehler, R., "An IBM Second Generation RISC Processor Architecture," *Proceedings 1989 IEEE International Conference on Computer Design: VLSI in Computers and Processors*, IEEE, Oct. 1989, pp. 134-137.

Horst, R.W. et al., "Multiple Instruction Issue in the NonStop Cyclone Processor," *Proceedings of the 17th Annual International Symposium on Computer Architecture*, ACM, 1990, pp. 216-226.

Hwu, W. et al., "An HPS Implementation of VAX: Initial Design and Analysis," *Proceedings of the Nineteenth Annual Hawaii International Conference on System Sciences*, 1986, pp. 282-291.

Hwu, W. W. and Patt, Y.N., "Checkpoint Repair for High-Performance Out-of-Order Execution Machines," *IEEE Transactions on Computers*, IEEE, vol. C-36, No. 12, Dec. 1987, pp. 1496-1514.

Hwu, W. and Patt, Y.N., "Design Choices for the HPSm Microprocessor Chip," *Proceedings of the Twentieth Annual Hawaii International Conference on System Sciences*, 1987, pp. 330-336.

Hwu, W.W. and Chang, P.P., "Exploiting Parallel Microprocessor Microarchitectures with a Compiler Code Generator," *Proceedings of the 15th Annual International Symposium on Computer Architecture*, IEEE, Jun. 1988, pp. 45-53.

Hwu, W. and Patt, Y.N., "HPSm, a High Performance Restricted Data Flow Architecture Having Minimal Functionality," *Proceedings of the 13th Annual Symposium on Computer Architecture*, IEEE, 1986, pp. 297-306.

Hwu, W. and Patt, Y.N., "HPSm2: A Refined Single-chip Microengine," Proceedings of *HICSS-21—vol. I—Architecture*, 1988, pp. 30-40.

*IBM Journal of Research and Development*, IBM, vol. 34, No. 1, Jan. 1990, pp. 1-70.

Johnson, W. M., *Super-Scalar Processor Design*, Dissertation for Stanford University, 1989, pp. ii-xiii and 1-134.

Jouppi, N.P. and Wall, D.W., "Available Instruction-Level Parallelism for Superscalar and Superpipelined Machines," *Proceedings—3rd International Conference on Architectural Support for Programming Languages and Operating Systems*, ACM, Apr. 1989, pp. 272-282.

Jouppi, N.P., "Integration and Packaging Plateaus of Processor Performance," *International Conference of Computer Design*, IEEE, Oct. 2-4, 1989, pp. 229-232.

Jouppi, N.P., "The Nonuniform Distribution of Instruction-Level and Machine Parallelism and Its Effect on Performance," *IEEE Transactions on Computers*, IEEE, vol. 38, No. 12, Dec. 1989, pp. 1645-1658.

Keller, R.M., "Look-Ahead Processors," *Computing Surveys*, ACM, vol. 7, No. 4, Dec. 1975, pp. 177-195.

Lam, M.S., "Instruction Scheduling For Superscalar Architectures," *Annu. Rev. Comput. Sci.*, Annual Reviews, Inc., vol. 4, 1990, pp. 173-201.

Lightner, B.D. and Hill, G., "The Metaflow Lightning Chip Set," *COMPCON Spring '91 digest of papers*, IEEE Computer Society Press, Feb. 25-Mar. 1, 1991, pp. 13-18.

Melvin, S. and Patt, Y., "Exploiting Fine-Grained Parallelism Through a Combination of Hardware and Software Techniques," *The 18th Annual International Symposium on Computer Architecture*, vol. 19, No. 3, ACM, May 1991, pp. 287-296.

Murakami, K. et al., "SIMP (Single Instruction stream/Multiple instruction Pipelining): A Novel High-Speed Single-Processor Architecture," *Proceedings of the 16th Annual International Symposium on Computer Architecture*, ACM, 1989, pp. 78-85.

Patt, Y.N. et al., "Critical Issues Regarding HPS, A High Performance Microarchitecture," *Proceedings of the 18th Annual Workshop on Microprogramming*, ACM, Dec. 3-6, 1985, pp. 109-116.

Patt, Y. et al., "Experiments with HPS, a Restricted Data Flow Microarchitecture for High Performance Computers," *COMPCON '86 digest of papers*, 1986, pp. 254-258.

Patt, Y.N. et al., "HPS, A New Microarchitecture: Rationale and Introduction," *Proceedings of the 18th Annual Workshop on Microprogramming*, ACM, Dec. 1985, pp. 103-108.

Patt, Y.N. et al., "Run-Time Generation of HPS Microinstructions From a VAX Instruction Stream," *International Symposium on Microarchitecture: Proceedings of the 19th Annual Workshop on Microprogramming*, ACM, 1986, pp. 75-81.

Patterson, D.A. and Hennessy, J.L, *Computer Architecture A Quantitative Approach*, Morgan Kaufmann Publishers, Inc., 1990, pp. xi-xv, 257-278, 290-314 and 449.

Peleg, A. and Weiser, U., "Future Trends in Microprocessors: Out-of-Order Execution, Speculative Branching And Their CISC Performance Potential", IEEE, 1991, pp. 263-266.

Pleszkun, A.R. and Sohi, G.S., "The Performance Potential of Multiple Functional Unit Processors*," *Proceedings of the 15th Annual International Symposium on Computer Architecture*, IEEE, Jun. 1988, pp. 37-44.

Pleszkun, A.R. et al., "WISQ: A Restartable Architecture Using Queues," *Proceedings of the 14th International Symposium on Computer Architecture*, ACM, Jun. 1987, pp. 290-299.

Popescu, V. et al., "The Metaflow Architecture", *IEEE Micro*, IEEE, Jun. 1991, pp. 10-13 and 63-73.

Smith, M.D. et al., "Boosting Beyond Static Scheduling in a Superscalar Processor," *ACM SIGARCH Computer Architecture News*, ACM, vol. 18, Issue 3, Jun. 1990, pp. 344-354.

Smith, J.E. and Pleszkun, A.R., "Implementation of Precise Interrupts in Pipelined Processors," *Proceedings of the 12th Annual International Symposium on Computer Architecture*, IEEE, Jun. 1985, pp. 36-44.

Smith, M.D. et al., "Limits on Multiple Instruction Issue," *Proceedings of the 3rd International Conference on Architectural Support for Programming Languages and Operating Systems*, ACM, Apr. 1989, pp. 290-302.

Sohi, G. S. and Vajapeyam, S., "Instruction Issue Logic For High-Performance, Interruptable Pipelined Processors," *Proceedings of the 14th Annual International Symposium on Computer Architecture*, ACM, Jun. 2-5, 1987, pp. 27-34.

Swensen, J.A. and Patt, Y.N., "Hierarchical Registers for Scientific Computers," *Conference Proceedings: 1988 International Conference on Supercomputing*, ICS, Jul. 4-8, 1988, pp. 346-353.

Thornton, J.E., *Design of a Computer: The Control Data 6600*, Control Data Corporation, 1970, pp. 58-140.

Tjaden, G.S. and Flynn, M.J., "Detection and Parallel Execution of Independent Instructions," *IEEE Transactions On Computers*, IEEE, vol. C-19, No. 10, Oct. 1970, pp. 889-895.

Tjaden, G.S. and Flynn, M.J., "Representation of Concurrency with Ordering Matrices," *IEEE Transactions On Computers*, IEEE, vol. C-22, No. 8, Aug. 1973, pp. 752-761.

Tjaden, G.J., *Representation and Detection of Concurrency Using Ordering Matrices*, Dissertation for The Johns Hopkins University, UMI Dissertation Services, 1972, pp. 1-199.

Tomasulo, R.M., "An Efficient Algorithm for Exploiting Multiple Arithmetic Units," *IBM Journal of Research and Development*, International Business Machines Corporation, vol. 11, No. 1, Jan. 1967, pp. 25-33.

Uht, A.K., "An Efficient Hardware Algorithm to Extract Concurrency From General-Purpose Code," *Proceedings of the 19th Annual Hawaii International Conference on System Sciences*, vol. I, University of Hawaii, 1986, pp. 41-50.

Uvieghara, G.A. et al., "An Experimental Single-Chip Data Flow CPU," *IEEE Journal of Solid-State Circuits*, vol. 27, No. 1, Jan. 1992, pp. 17-28.

Uvieghara, G.A. et al., "An Experimental Single-Chip Data Flow CPU," *Symposium on ULSI Circuits Design Digest of Technical Papers*, May 1990, 2 pages.

Wedig, R.G., *Detection of Concurrency In Directly Executed Language Instruction Streams*, Dissertation for Stanford University, UMI Dissertation Services, Jun. 1982, pp. ii, iii, v, vii-xv and 1-179.

Weiss, S. and Smith, J.E., "Instruction Issue Logic in Pipelined Supercomputers," *IEEE Transactions on Computers*, IEEE, vol. C-33, No. 11, Nov. 1984, pp. 1013-1022 (77-86).

Wilson, J.E. et al., "On Tuning the Microarchitecture of an HPS Implementation of the VAX," *MICRO 20: Proceedings of the 20th Annual Workshop on Microprogramming*, ACM SIGMICRO and IEEE CS TC-MICRO, Dec. 1-4, 1987, pp. 162-167.

*Complaint*, 7 pages, filed Oct. 11, 2006, in *Transmeta Corporation v. Intel Corporation*, in the U.S. District Court for the District of Delaware, Case No. 1:06-cv-00633.

*First Amended Complaint*, 7 pages, filed Dec. 12, 2006, in *Transmeta Corporation v. Intel Corporation*, in the U.S. District Court for the District of Delaware, Case No. 1:06-cv-00633.

*Intel Corporation's Answer, Affirmative Defenses, and Counterclaims to Transmeta's First Amended Complaint*, 27 pages, filed Jan. 9, 2007, in *Transmeta Corporation v. Intel Corporation*, in the U.S. District Court for the District of Delaware, Case No. 1:06-cv-00633.

*Intel Corporation's Responses to Transmeta's First Set of Interrogatories to Intel Corporation* (Nos. 1-24)—*Redacted Public Version*, 132 pages, dated May 18, 2007, in *Transmeta Corporation v. Intel Corporation*, in the U.S. District for the District of Delaware, Case No. 1:06-cv-00633.

*Intel Corporation's Supplemental Responses to Transmeta Interrogatory* Nos. 8, 9, 12, 19, and 21-23—*Redacted Public Version*, 27 pages, dated Aug. 23, 2007, in *Transmeta Corporation v. Intel Corporation*, in the U.S. District for the District of Delaware, Case No. 1:06-cv-00633.

*Intel Corporation's Opening Claim Construction Brief*, 76 pages, dated Oct. 19, 2007, in *Transmeta Corporation v. Intel Corporation*, in the U.S. District for the District of Delaware, Case No. 1:06-cv-00633.

*Transmeta Corporation's Opening Claim Construction Brief*, 66 pages, dated Oct. 19, 2007, in *Transmeta Corporation v. Intel Corporation*, in the U.S. District for the District of Delaware, Case No. 1:06-cv-00633.

Paper #28 (Office Action dated Jun. 19, 1996) from U.S. Appl. No. 08/481,146, 8 pages.

Paper #32 (Office Action dated Nov. 18, 1996) from U.S. Appl. No. 08/481,146, 4 pages.

H. Vin et al., "Instruction Scheduling in High-Performance Architectures—MIDR Algorithm," CIPS Edmonton '88, Chaos Into Order, Proceedings, Edmonton, Alta., Canada, pp. 69-75, Nov. 7, 1988.

Johnson, Mike, *Super-Scalar Microprocessor Design*, Prentice-Hall, Dec. 1, 1990.

*Order Granting Request for Ex Parte Reexamination*, mailed May 11, 2007 in U.S. Appl. No. 90/008,573, 17 pages.

*Order Granting Request for Ex Parte Reexamination*, mailed Aug. 13, 2007 in U.S. Appl. No. 90/008,691, 20 pages.

*Order Granting Request for Ex Parte Reexamination*, mailed Aug. 29, 2007 in U.S. Appl. No. 90/008,712, 16 pages.

Butler, M. and Patt, Y., "An Investigation of the Performance of Various Dynamic Scheduling Techniques," *Proceedings from MICRO-25*, pp. 1-9 (Dec. 1-4, 1992).

Kateveris, Hardware Support "Thesis," p. 138-145 (1984).

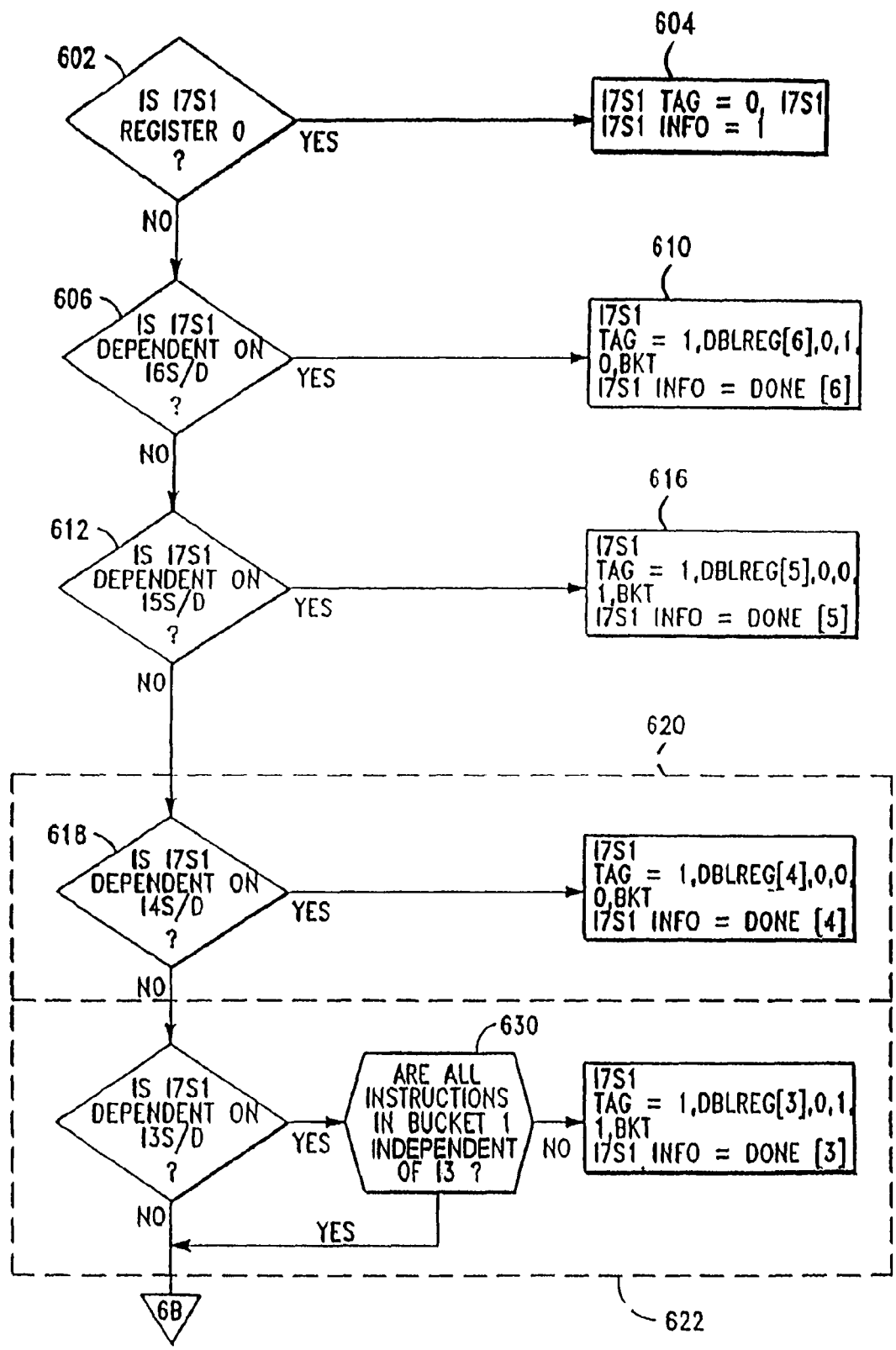
FIG.—6A

SUPERSCALAR RISC INSTRUCTION SCHEDULING

CROSS-REFERENCE TO RELATED APPLICATIONS

This application is a continuation of application Ser. No. 11/252,820, filed Oct. 19, 2005, which is a continuation of application Ser. No. 10/086,197, filed Mar. 1, 2002, now U.S. Pat. No. 7,051,187, which is a continuation of application Ser. No. 09/906,099, filed Jul. 17, 2001, now abandoned, which is a continuation of application Ser. No. 09/329,354, filed Jun. 10, 1999, now U.S. Pat. No. 6,289,433, which is a continuation of application Ser. No. 08/990,414, filed Dec. 15, 1997, now U.S. Pat. No. 5,974,526, which is a continuation of application Ser. No. 08/594,401, filed Jan. 31, 1996, now U.S. Pat. No. 5,737,624, which is a continuation of application Ser. No. 08/219,425, filed Mar. 29, 1994, now U.S. Pat. No. 5,497,499, which is a continuation of application Ser. No. 07/860,719, filed Mar. 31, 1992, now abandoned. The disclosures of each of the above-referenced applications are incorporated herein by reference.

The following are related applications: "Semiconductor Floor Plan and Method for a Register Renaming Circuit," Ser. No. 07/860,718, filed Mar. 31, 1992, now U.S. Pat. No. 5,371,684; "High-Performance, Superscalar-Based Computer System with Out-Of-Order Instruction Execution," Ser. No. 07/817,810, filed Jan. 8, 1992, now U.S. Pat. No. 5,539,911; and "High-Performance, Superscalar-Based Computer System with Out-Of-Order Instruction Execution and Concurrent Results Distribution," Ser. No. 08/397,016, filed Mar. 1, 1995, now U.S. Pat. No. 5,560,032. The disclosures of the above applications are incorporated herein by reference.

BACKGROUND OF THE INVENTION

1. Field of the Invention

The present invention relates to superscalar reduced instruction set computers (RISC). More particularly, the present invention relates to instruction scheduling including register renaming and instruction issuing for superscalar RISC computers.

2. Related Art

A more detailed description of some of the basic concepts discussed in this application is found in a number of references, including Mike Johnson, *Superscalar Microprocessor Design* (Prentice-Hall, Inc., Englewood Cliffs, N.J., 1991); John L. Hennessy et al., *Computer Architecture—A Quantitative Approach* (Morgan Kaufmann Publishers, Inc., San Mateo, Calif., 1990). Johnson's text, particularly Chapters 2, 6 and 7 provide an excellent discussion of the register renaming issues addressed by the present invention.

A major consideration in a superscalar RISC processor is to how to execute multiple instructions in parallel and out-of-order, without incurring data errors due to dependencies inherent in such execution. Data dependency checking, register renaming and instruction scheduling are integral aspects of the solution.

Storage Conflicts and Register Renaming

True dependencies (sometimes called "flow dependencies" or "write-read" dependencies) are often grouped with anti-dependencies (also called "read-write" dependencies) and output dependencies (also called "write-write" dependencies) into a single group of instruction dependencies. The reason for this grouping is that each of these dependencies manifests itself through use of registers or other storage locations. However, it is important to distinguish true dependencies from the other two. True dependencies represent the flow of data and information through a program. Anti- and output dependencies arise because, at different points in time, registers or other storage locations hold different values for different computations.

When instructions are issued in order and complete in order, there is a one-to-one correspondence between registers and values. At any given point in execution, a register identifier precisely identifies the value contained in the corresponding register. When instructions are issued out of order and complete out of order, correspondence between registers and values breaks down, and values conflict for registers. This problem is severe when the goal of register allocation is to keep as many values in as few registers as possible.

Keeping a large number of values in a small number of registers creates a large number of conflicts when the execution order is changed from the order assumed by the register allocator.

Anti- and output dependencies are more properly called "storage conflicts" because reusing storage locations (including registers) causes instructions to interfere with one another even though conflicting instructions are otherwise independent. Storage conflicts constrain instruction issue and reduce performance. But storage conflicts, like other resource conflicts, can be reduced or eliminated by duplicating the troublesome resource.

Dependency Mechanisms

Johnson also discusses in detail various dependency mechanisms, including: software, register renaming, register renaming with a reorder buffer, register renaming with a future buffer, interlocks, the copying of operands in the instruction window to avoid dependencies, and partial renaming.

A conventional hardware implementation relies on software to enforce dependencies between instructions. A compiler or other code generator can arrange the order of instructions so that the hardware cannot possibly see an instruction until it is free of true dependencies and storage conflicts. Unfortunately, this approach runs into several problems. Software does not always know the latency of processor operations, and thus, cannot always know how to arrange instructions to avoid dependencies. There is the question of how the software prevents the hardware from seeing an instruction until it is free of dependencies. In a scalar processor with low operation latencies, software can insert "no-ops" in the code to satisfy data dependencies without too much overhead. If the processor is attempting to fetch several instructions per cycle, or if some operations take several cycles to complete, the number of no-ops required to prevent the processor from seeing dependent instructions rapidly becomes excessive, causing an unacceptable increase in code size. The no-ops use a precious resource, the instruction cache, to encode dependencies between instructions.

When a processor permits out-of-order issue, it is not at all clear what mechanism software should use to enforce dependencies. Software has little control over the behavior of the processor, so it is hard to see how software prevents the processor from decoding dependent instructions The second consideration is that no existing binary code for any scalar processor enforces the dependencies in a superscalar processor, because the mode of execution is very different in the superscalar processor. Relying on software to enforce dependencies requires that the code be regenerated for the superscalar processor. Finally, the dependencies in the code are directly determined by the latencies in the hardware, so that the best code for each version of a superscalar processor depends on the implementation of that version.

On the other hand, there is some motivation against hardware dependency techniques, because they are inherently complex. Assuming instructions with two input operands and one output value, as holds for typical RISC instructions, then there are five possible dependencies between any two instructions: two true dependencies, two anti-dependencies, and one output dependency. Furthermore, the number of dependencies between a group of instructions, such as a group of instructions in a window, varies with the square of the number of instructions in the group, because each instruction must be considered against every other instruction.

Complexity is further multiplied by the number of instructions that the processor attempts to decode, issue, and complete in a single cycle. These actions introduce dependencies. The only aid in reducing complexity is that the dependencies can be determined incrementally, over many cycles to help reduce the scope and complexity of the dependency hardware.

One technique for removing storage conflicts is by providing additional registers that are used to reestablish the correspondence between registers and values. The additional registers are conventionally allocated dynamically by hardware, and the registers are associated with values needed by the program using "register renaming." To implement register renaming, processors typically allocate a new register for every new value produced (i.e., for every instruction that writes a register). An instruction identifying the original register, for the purpose of reading its value, obtains instead the value in the newly allocated register. Thus, hardware renames the original register identifier in the instruction to identify the new register and correct value. The same register identifier in several different instructions may access different hardware registers, depending on the locations of register references with respect to register assignments.

Consider the following code sequence where "op" is an operation, "Rn" represents a numbered register, and ":=" represents assignment:

$R3b := R3a$ op $R5a$ (1)

$R4b := R3b + 1$ (2)

$R3c := R5a + 1$ (3)

$R7b := R3c$ op $R4b$ (4)

Each assignment to a register creates a new "instance" of the register, denoted by an alphabetic subscript. The creation of a new instance for R3 in the third instruction avoids the anti- and output dependencies on the second and first instructions, respectively, and yet does not interfere with correctly supplying an operand to the fourth instruction. The assignment to R3 in the third instruction supersedes the assignment to R3 in the first instruction, causing R3c to become the new R3 seen by subsequent instructions until another instruction assigns a value to R3.

Hardware that performs renaming creates each new register instance and destroys the instance when its value is superseded and there are no outstanding references to the value. This removes anti- and output dependencies and allows more instruction parallelism. Registers are still reused, but reuse is in line with the requirements of parallel execution. This is particularly helpful with out-of-order issue, because storage conflicts introduce instruction issue constraints that are not really necessary to produce correct results. For example, in the preceding instruction sequence, renaming allows the third instruction to be issued immediately, whereas, without renaming, the instruction must be delayed until the first instruction is complete and the second instruction is issued.

Another technique for reducing dependencies is to associate a single bit (called a "scoreboard bit") with each register. The scoreboard bit is used to indicate that a register has a pending update. When an instruction is decoded that will write a register, the processor sets the associated scoreboard bit. The scoreboard bit is reset when the write actually occurs. Because there is only one scoreboard bit indicating whether or not there is a pending update, there can be only one such update for each register. The scoreboard stalls instruction decoding if a decoded instruction will update a register that already has a pending update (indicated by the scoreboard bit being set). This avoids output dependencies by allowing only one pending update to a register at any given time.

Register renaming, in contrast, uses multiple-bit tags to identify the various uncomputed values, some of which values may be destined for the same processor register (that is, the same program-visible register). Conventional renaming requires hardware to allocate tags from a pool of available tags that are not currently associated with any value and requires hardware to free the tags to the pool once the values have been computed. Furthermore, since scoreboarding allows only one pending update to a given register, the processor is not concerned about which update is the most recent.

A further technique for reducing dependencies is using register renaming with a "reorder buffer" which uses associative lookup. The associative lookup maps the register identifier to the reorder buffer entry as soon as the entry is allocated, and, to avoid output dependencies, the lookup is prioritized so that only the value for the most recent assignment is obtained if the register is assigned more than once. A tag is obtained if the result is not yet available. There can be as many instances of a given register as there are reorder buffer entries, so there are no storage conflicts between instructions. The values for the different instances are written from the reorder buffer to the register file in sequential order. When the value for the final instance is written to the register file, the reorder buffer no longer maps the register; the register file contains the only instance of the register, and this is the most recent instance.

However, renaming with a reorder buffer relies on the associative lookup in the reorder buffer to map register identifiers to values. In the reorder buffer, the associative lookup is prioritized so that the reorder buffer always provides the most recent value in the register of interest (or a tag). The reorder buffer also writes values to the register file in order, so that, if the value is not in the reorder buffer, the register file must contain the most recent value In a still further technique for reducing dependencies, associative lookup can be eliminated using a "future file." The future file does not have the properties of the reorder buffer discussed in the preceding paragraph. A value presented to the future file to be written may not be the most recent value destined for the corresponding register, and the value cannot be treated as the most recent value unless it actually is. The future file therefore keeps track of the most recent update and checks that each write corresponds to the most recent update before it actually performs the write.

When an instruction is decoded, it accesses tags in the future file along with the operand values. If the register has one or more pending updates, the tag identifies the update value required by the decoded instruction. Once an instruction is decoded, other instructions may overwrite this instruction's source operands without being constrained by anti-dependencies, because the operands are copied into the instruction window. Output dependencies are handled by preventing the writing as a result into the future file if the result does not have a tag for the most recent value. Both anti- and output dependencies are handled without stalling instruction issue.

If dependencies are not removed through renaming, "interlocks" must be used to enforce dependencies. An interlock simply delays the execution of an instruction until the instruction is free of dependencies. There are two ways to prevent an instruction from being executed: one way is to prevent the instruction from being decoded, and the other is to prevent the instruction from being issued.

To improve performance over scoreboarding, interlocks are moved from the decoder to the instruction window using a "dispatch stack." The dispatch stack is an instruction window that augments each instruction in the window with dependency counts. There is a dependency count associated with the source register of each instruction in the window, giving the number of pending prior updates to the source register and thus the number of updates that must be completed before all possible true dependencies are removed. There are two similar dependency counts associated with the destination register of each instruction in the window, giving both the number of pending prior uses of the register (which is the number of anti-dependencies) and the number of pending prior updates to the register (which is the number of output dependencies).

When an instruction is decoded and loaded into the dispatch stack, the dependency counts are set by comparing the instruction's register identifiers with the register identifiers of all instructions already in the dispatch stack. As instructions complete, the dependency counts of instructions that are still in the window are decremented based on the source and destination register identifiers of completing instructions (the counts are decremented by a variable amount, depending on the number of instructions completed). An instruction is independent when all of its counts are zero. The use of counts avoids having to compare all instructions in the dispatch stack to all other instructions on every cycle.

Anti-dependencies can be avoided altogether by copying operands to the instruction window (for example, to the reservation stations) during instruction decode. In this manner, the operands cannot be overwritten by subsequent register updates. Operands can be copied to eliminate anti-dependencies in any approach, independent of register renaming. The alternative to copying operands is to interlock anti-dependencies, but the comparators and/or counters required for these interlocks are costly, considering the number of combinations of source and result registers to be compared.

A tag can be supplied for the operand rather than the operand itself. This tag is simply a means for the hardware to identify which value the instruction requires, so that, when the operand value is produced, it can be matched to the instruction. If there can be only one pending update to a register, the register identifier can serve as a tag (as with scoreboarding). If there can be more than one pending update to a register (as with renaming), there must be a mechanism for allocating result tags and insuring uniqueness.

An alternative to scoreboarding interlocking is to allow multiple pending updates of registers to avoid stalling the decoder for output dependencies, but to handle anti-dependencies by copying operands (or tags) during decode. An instruction in the window is not issued until it is free of output dependencies, so the updates to each register are performed in the same order in which they would be performed with in-order completion, except that updates for different registers are out of order with respect to each other. The alternative has almost all of the capabilities of register renaming, lacking only the capability to issue instructions so that updates to the same register occur out of order.

There appears to be no better alternative to renaming other than with a reorder buffer. Underlying the discussion of dependencies has been the assumption that the processor performs out-of-order issue and already has a reorder buffer for recovering from mispredicted branches. Out-of-order issue makes it unacceptable to stall the decoder for dependencies. If the processor has an instruction window, it is inconsistent to limit the look ahead capability of the processor by interlocking the decoder. There are then only two alternatives: implement anti- and output dependency interlocks in the window or remove these altogether with renaming.

SUMMARY OF THE INVENTION

The present invention is directed to instruction scheduling including register renaming and instruction issuing for superscalar RISC computers. A Register Rename Circuit (RRC), which is part of the scheduling logic allows a computer's Instruction Execution Unit (IEU) to execute several instructions at the same time while avoiding dependencies. In contrast to conventional register renaming, the present invention does not actually rename register addresses. The RRC of the present invention temporarily buffers the instruction results, and the results of out-of-order instruction execution are not transferred to the register file until all previous instructions are done. The RRC also performs result forwarding to provide temporarily buffered operands (results) to dependant instructions. The RRC contains three subsections: a Data Dependency Checker (DDC), Tag Assign Logic (TAL) and Register file Port MUXes (RPM).

The function of the DDC is to locate the dependencies between the instructions for a group of instructions. The DDC does this by comparing the addresses of the source registers of each instruction to the addresses of the destination registers of each previous instruction in the group. For example, if instruction A reads a value from a register that is written to by instruction B, then instruction A is dependent upon instruction B and instruction A cannot start until instruction B has finished. The DDC outputs indicate these dependencies.

The outputs of the DDC go to the TAL. Because it is possible for an instruction to be dependent on more than one previous instruction, the TAL must determine which of those previous instructions will be the last one to be executed. The present invention automatically maps each instruction to a predetermined temporary buffer location; hence, the present invention does not need prioritized associative look-up as used by conventional reorder buffers, thereby saving chip area/cost and execution speed.

Out-of-order results for several instructions being executed at the same time are stored in a set of temporary buffers, rather than the file register designated by the instruction. If the DDC determines, for example, that a register that instruction 6's source is written to by instructions 2, 3 and 5, then the TAL will indicate that instruction 6 must wait for instruction 5 by outputting the "tag" of instruction 5 for instruction 6. The tag of instruction 5 shows the temporary buffer location where instruction 5's result is stored. It also contains a one bit signal (called a "done flag") that indicates if instruction 5 is finished or not. The TAL will output three tags for each instruction, because each instruction can have three source registers. If an instruction is not dependent on any previous instruction, the TAL will output the register file address of the instruction's input, rather than a temporary buffer's address.

The last part of the RRC are the RPMs or Register file Port MUXes. The inputs of the RPMs are the outputs of the TAL, and the select lines for the RPMs come from another part of the IEU called the Instruction Scheduler or Issuer. The Instruction Scheduler chooses which instruction to execute (this decision is based partly on the done flags) and then uses the RPMs to select the tags of that instruction. These tags go to the read address ports of the computer's register files. In the previous example, once instruction 5 has finished, the Instruction Scheduler will start instruction 6. It will select the RPM so that the address of instruction 5's result (its tag) is sent to the register file, and the register file will make the result of instruction 5 available to instruction 6.

The foregoing and other features and advantages of the present invention will be apparent from the following more particular description of the preferred embodiments of the invention, as illustrated in the accompanying drawings.

BRIEF DESCRIPTION OF THE FIGURES

The invention will be better understood if reference is made to the accompanying drawings.

FIGS. 6A and 6B are representative flowcharts showing a tag assignment method in accordance with the present invention.

DETAILED DESCRIPTION OF THE INVENTION

Figure 1:
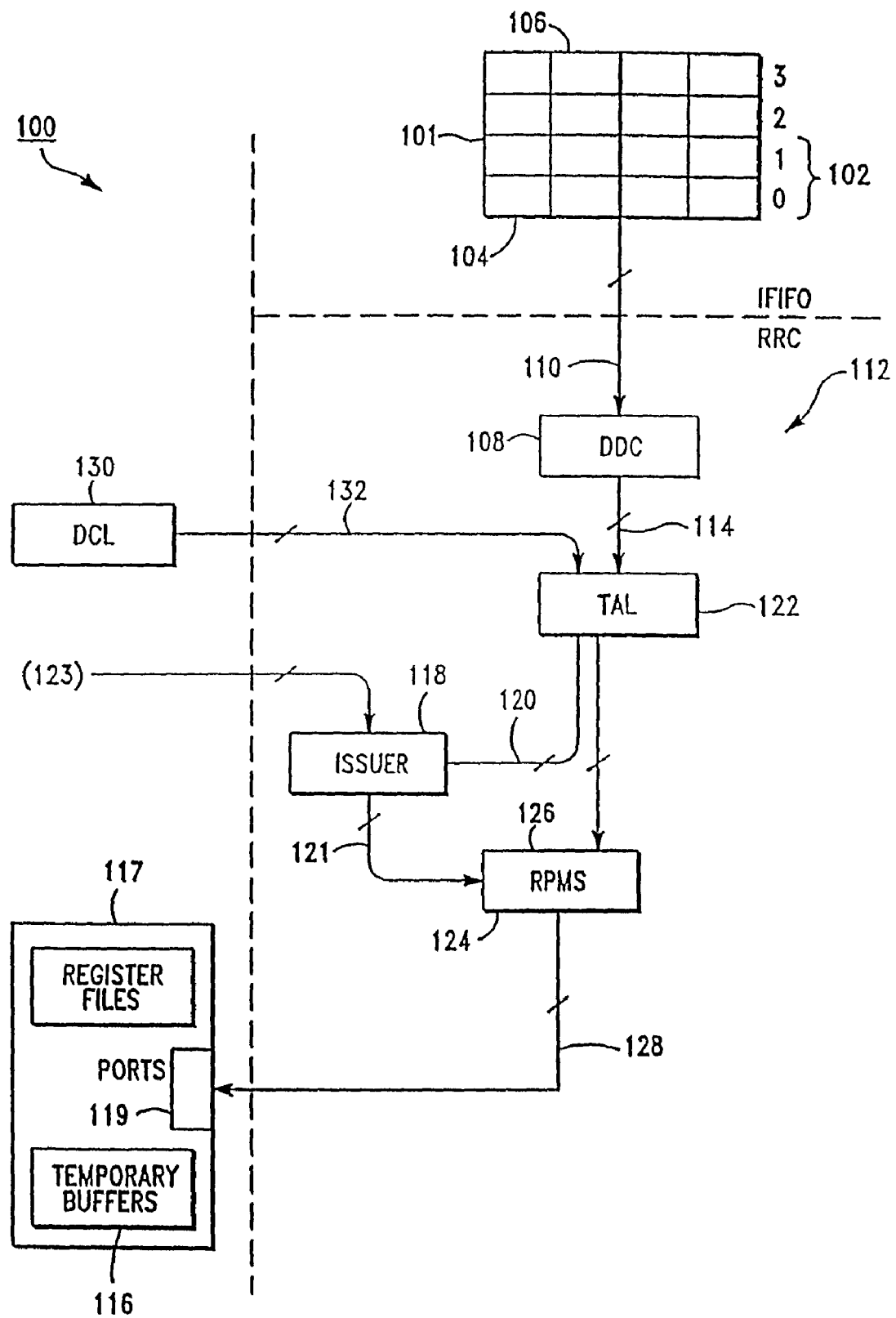
FIG. 1 shows a representative high level block diagram of the register renaming circuit of the present invention.

FIG. 1 shows a representative high level block diagram of an Instruction Execution Unit (IEU) 100 associated with the present invention. The goal of IEU 100 is to execute as many instructions as possible in the shortest amount of time. There are two basic ways to accomplish this: optimize IEU 100 so that each instruction takes as little time as possible or optimize IEU 100 so that it can execute several instructions at the same time.

Instructions are sent to IEU 100 from an Instruction Fetch Unit (IFU, not shown) through an instruction FIFO (first-in-first-out register stack storage device) 101 in groups of four called "buckets." IEU 100 can decode and schedule up to two buckets of instructions at one time. FIFO 101 stores 16 total instructions in four buckets labeled 0-3. IEU 100 looks at an instruction window 102. In one embodiment of the present invention, window 102 comprises eight instructions (buckets 0 and 1). Every cycle IEU 100 tries to issue a maximum number of instructions from window 102. Window 102 functions as an instruction buffer register. Once the instructions in a bucket are executed and their results stored in the processor's register file (see block 117), the bucket is flushed out a bottom 104 and a new bucket is dropped in at atop 106.

In order to execute instructions in parallel or out of order, care must be taken so that the data that each instruction needs is available when the instruction needs it and also so that the result of each instruction is available for any future instructions that might need it. A Register Rename Circuit (RRC), which is part of the scheduling logic of the computer's IEU performs this function by locating dependencies between current instructions and then renaming the sources (inputs) of the instruction.

As noted above, there are three types of dependencies: input dependencies, output dependencies and anti-dependencies. Input dependencies occur when an instruction, call it A, performs an operation on the result of a previous instruction, call it B. Output dependencies occur when the outputs of A and B are to be stored in the same place. Anti-dependencies occur when instruction A comes before B in the instruction stream and B's result will be stored in the same place as one of A's inputs.

Input dependencies are handled by not executing instructions until their inputs are available. RRC 112 is used to locate the input dependencies between current instructions and then to signal an Instruction Scheduler or Issuer 118 when all inputs for a particular instruction are ready. In order to locate these dependencies, RRC 112 compares the register file addresses of each instruction's inputs with the addresses of each previous instruction's output using a data dependency circuit (DDC) 108. If one instruction's input comes from a register where a previous instruction's output will be stored, then the latter instruction must wait for the former to finish.

This implementation of RRC 112 can check eight instructions at the same time, so a current instruction is defined as any one of those eight from window 102. It should become evident to those skilled in the art that the present invention can easily be adapted to check more or less instructions.

In one embodiment of the present invention, instructions can have from 0 to 3 inputs and 0 or 1 outputs. Most instructions' inputs and outputs come from, or are stored in, one of several register files. Each register file 117 (e.g., separate integer, floating and boolean register files) has 32 real entries plus the group of 8 temporary buffers 116. When an instruction completes (the term "complete" means that the operation is complete and the operand is ready to be written to its destination register), its result is stored in its preassigned location in the temporary buffers 116. Its result is later moved to the appropriate place in register file 117 after all previous instructions' results have been moved to their places in the register file. This movement of results from temporary buffers 116 to register file 117 is called "retirement" and is controlled by termination logic, as should become evident to those skilled in the art. More than one instruction may be retired at a time. Retirement comprises updating the "official state" of the machine, including the computer's Program Counter, as will become evident to those skilled in the art. For example, if instruction I0 happens to complete directly before instruction I1, both results can be stored directly into register file 117. But if instruction I3 then completes, its result must be stored in temporary buffer 116 until instruction I2 completes. By having IEU 100 store each instruction's result in its preassigned place in the temporary buffers 116, IEU 100 can execute instructions out of program order and still avoid the problems caused by output and anti-dependencies.

RRC 112 sends a bit map to an Instruction Scheduler 118 via a bus 120 indicating which instructions in window 102 are ready for issuing. Instruction decode logic (not shown) indicates to Issuer 118 the resource requirements for each instruction over a bus 123. For each resource in IEU 100 (e.g., each functional unit being an adder, multiplier, shifter, or the like), Issuer 118 scans this information and selects the first and subsequent instructions for issuing by sending issue signals over bus 121. The issue signals select a group of Register File Port MUXes (RPMs) 124 inside RRC 112 whose inputs are the addresses of each instruction's inputs.

Because the results may stay in temporary buffer 116 several cycles before going to register file 117, a mechanism is provided to get results from temporary buffer 116 before they go to register file 117, so the information can be used as operands for other instructions. This mechanism is called "result forwarding," and without it, Issuer 118 would not be able to issue instructions out of order. This result forwarding is done in register file 117 and is controlled by RRC 112. The control signals necessary for performing the result forwarding will become evident to those skilled in the art, as should the random logic used for generating such control signals.

If an instruction is not dependent on any of the current instructions, result forwarding is not necessary since the instruction's inputs are already in register file 117. When Issuer 118 decides to execute that instruction, RRC 112 tells register file 117 to output its data.

RRC 112 contains three subsections: a Data Dependency Checker (DDC) 108, Tag Assign Logic (TAL) 122 and Register File Port MUXes (RPM) 124. DDC 108 determines where the input dependencies are between the current instructions. TAL 122 monitors the dependencies for Issuer 118 and controls result forwarding. RPM 124 is controlled by Issuer 118 and directs the outputs of TAL 122 to the appropriate register file address ports 119. Instructions are passed to DDC 108 via bus 110. All source registers are compared with all previous destination registers for each instruction in window 102.

Each instruction has only one destination, which may be a double register in one embodiment. An instruction can only depend on a previous instruction and may have up to three source registers. There are various register file source and destination addresses that need to be checked against each other for any dependencies. As noted above, the eight bottom instructions corresponding to the lower two buckets are checked by DDC 108. All source register addresses are compared with all previous destination register addresses for the instructions in window 102.

For example, let's say a program has the following instruction sequence:

add R0, R1, R2     (0)

add R0, R2, R3     (1)

add R4, R5, R2     (2)

add R2, R3, R4     (3)

The first two registers in each instruction 0-3 are the source registers, and the last listed register in each instruction is the destination register. For example, R0 and R1 are the source registers for instruction 0 and R2 is the destination register. Instruction 0 adds the contents of registers 0 and 1 and stores the result in R2. For instructions 1-3 in this example, the following are the comparisons needed to evaluate all of the dependencies:

I1S1,I1S2 vs. I0D

I2S1, I2S2 vs. I1D, I0D

I3S1, I3S2 vs. I2D, I1D, I0D

The key to the above is as follows: IXRS1 is the address of source (input) number 1 of instruction X; IXRS2 is the address of source (input) number 2 of instruction X; and IXD is the address of the destination (output) of instruction X.

Note also that RRC 112 can ignore the fact that instruction 2 is output dependent on instruction 0, because the processor has a temporary buffer where instruction 2's result can be stored without interfering with instruction 0's result. As discussed before, instruction 2's result will not be moved from temporary buffers 116 to register file 117 until instructions 0 and 1's results are moved to register file 117.

The number of instructions that can be checked by RRC 112 is easily scaleable. In order to check eight instructions at a time instead of four, the following additional comparisons would also need to be made:

I4S1, I4S2 vs I3D, I2D, I1D, I0D

I5S1, I5S2 vs I4D, I3D, I2D, I1D, I0D

I6S1, I6S2 vs I5D, I4D, I3D, I2D, I1D, I0D

I7S1, I7S2 vs I6D, I5D, I4D, I3D, I2D, I1D, I0D

There are several special cases that RRC 112 must handle in order to do the dependency check. First, there are some instructions that use the same register as an input and an output. Thus, RRC 112 must compare this source/destination register address with the destination register addresses of all previous instructions. So for instruction 7, the following comparisons would be necessary:

I7S1, I7S2, I7S/D vs. I6D, I5D, I4D, I3D, I2D, I1D, I0D.

Another special case occurs when a program contains instructions that generate 64 bit outputs (called long-word operations). These instructions need two registers in which to store their results. In this embodiment, these registers must be sequential. Thus if RRC 112 is checking instruction 4's dependencies and instruction 1 is a long-word operation, then it must do the following comparisons:

I4S1, I4S2 vs. I3D, I2D, I1D, I1D+1, I0D

Sometimes, instructions do not have destination registers. Thus RRC 112 must ignore any dependencies between instructions without destination registers and any future instructions. Also, instructions may have only one valid source register, so RRC 112 must ignore any dependencies between the unused source register (usually S2) and any previous instructions.

RRC 112 is also capable of dealing with multiple register files. When using multiple register files, dependencies only occur when one instruction's source register has the same address and is in the same register file as some other instruction's destination register. RRC 112 treats the information regarding which register file a particular address is from as part of the address. For example, in an implementation using four 32 bit register files, RRC 112 would do 7 bit compares instead of 5 bit compares (5 for the address and 2 for the register file).

Signals indicating which instructions are long-word operations or have invalid source or destination registers are sent to RRC 112 from Instruction Decode Logic (IDL; not shown). IDL also tells RRC 112 which register file each instruction's sources and destinations will come from or go to.

Figure 2:
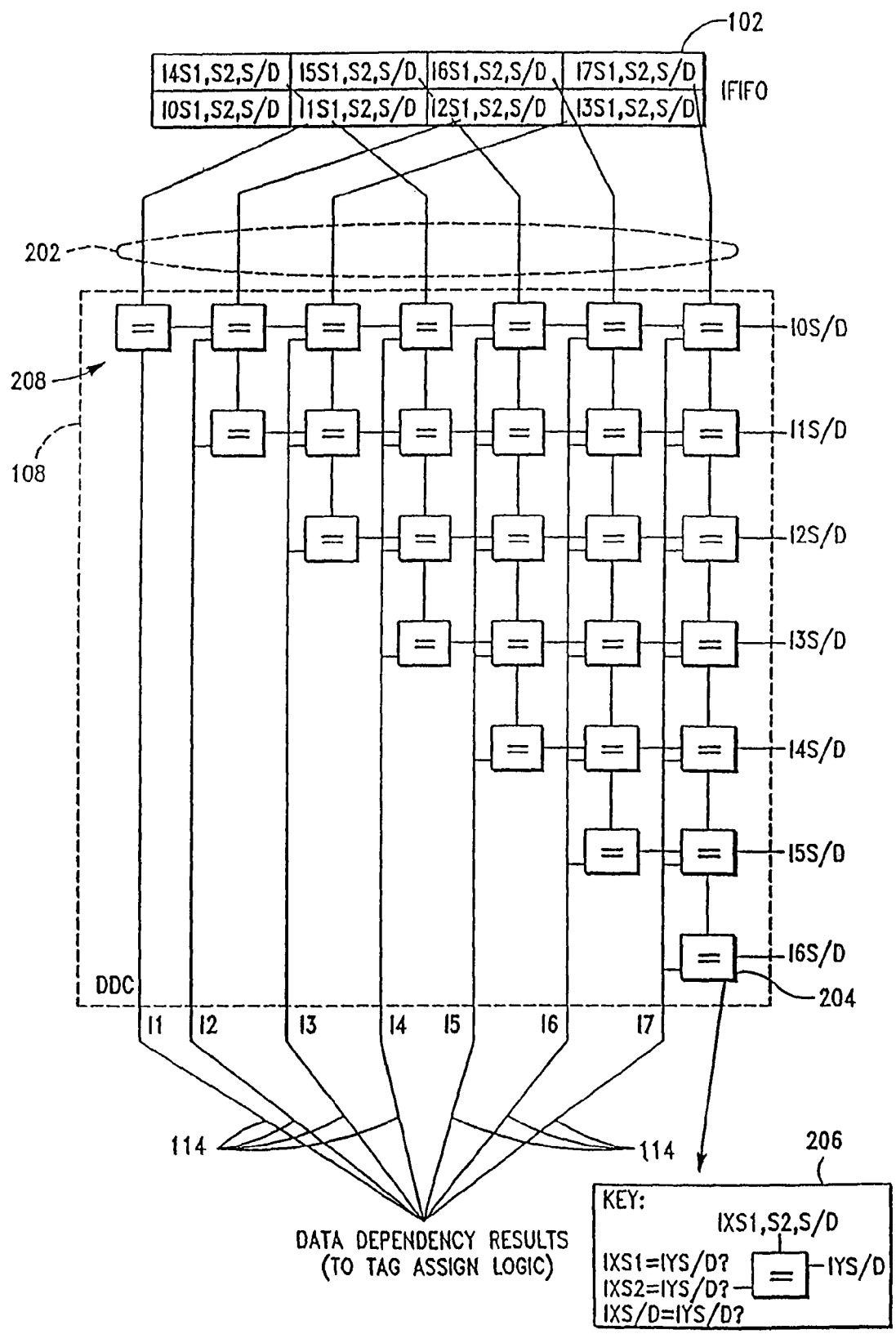
FIG. 2 shows a representative block diagram of the data dependency check circuit of the present invention.

A block diagram of DDC 108 is shown in FIG. 2. Source address signals arrive from IFIFO 101 for all eight instructions of window 102. Additional inputs include long-word load operation flags, register file decode signals, invalid destination register flags, destination address signals and addressing mode flags for all eight instructions.

DDC 208 comprises 28 data dependency blocks 204. Each block 204 is described in a KEY 206. Each block 204 receives 3 inputs, IXS1, IXS2 and IXS/D. IXS1 is the address of source (input) number 1 of instruction X, IXS2 is the address of source (input) number 2 of instruction X and IXS/D is the address of the source/destination (input) of instruction X. Each block 204 also receives input IYS/D, which is the destination register address for some previous instruction Y. A top row 208, for example, receives I0S/D, which is the destination register address for instruction 0. Each block 204 outputs the data dependency results to one of a corresponding bus line 114. For example, the address of I2S/D must be checked with operand addresses S1, S2 and S/D of instructions 7, 6, 5, 4, and 3.

Figure 7:
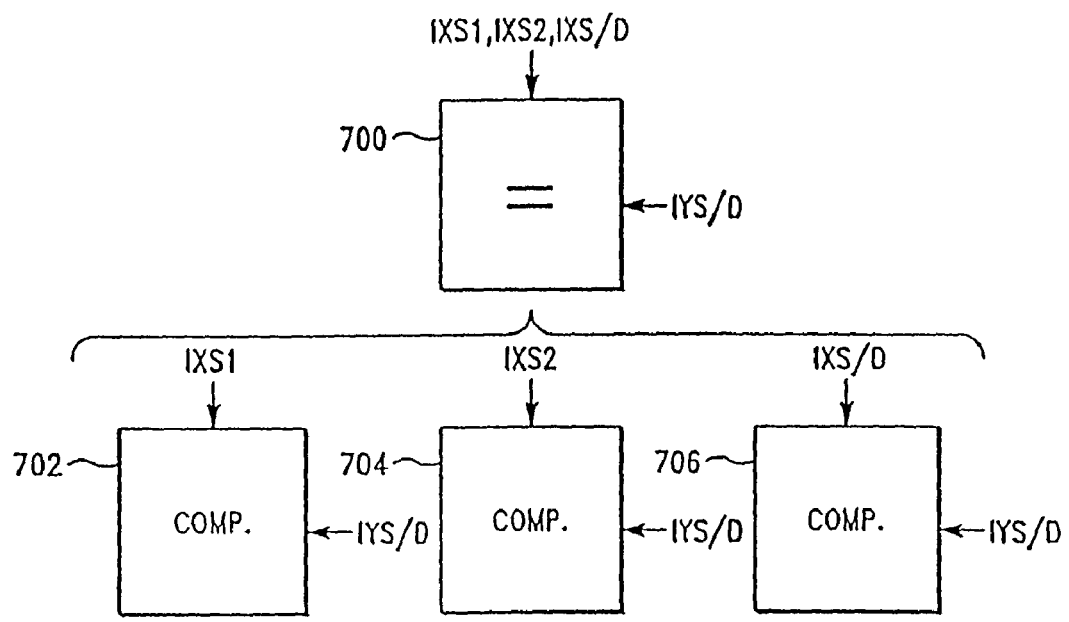
FIG. 7 shows a representative block diagram which compares an instruction Y's source/destination operand with each operand of an instruction X in accordance with an embodiment of the present invention.

Each block 204 performs the three comparisons. To illustrate these comparisons, consider a generic block 700 shown in FIG. 7, which compares instruction Y's source/destination operand with each operand of instruction X. In this example, the three following comparisons must be made:

$$IXS1=IYS/D$$

$$IXS2=IYS/D$$

$$IXS/D=IYS/D$$

These comparisons are represented by three comparator blocks 702, 704 and 706, respectively. One set of inputs to comparator blocks 702, 704 and 706 are the bits of the IYS/D field, which is represented by number 708. Comparator block 702 has as its second set of inputs the bits of the IXS1. Similarly, comparator block 704 has as its second set of inputs the bits of the IXS2, and comparator block 706 has as its second set of inputs the bits of the IXS/D.

Figure 8:
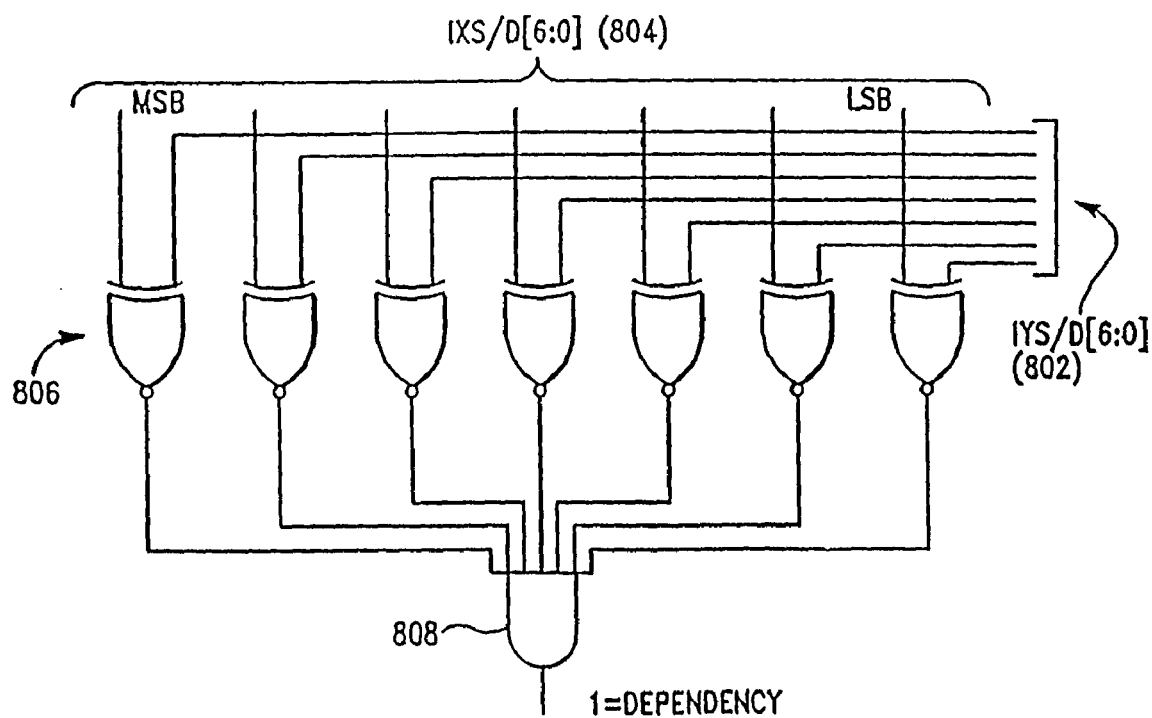
FIG. 8 shows a representative circuit diagram for comparator block 706 of FIG. 7.

In a preferred embodiment, the comparisons performed by blocks 702, 704 and 706 can be performed by random logic. An example of random logic for comparator block 706 is shown in FIG. 8. Instruction Y's source/destination bits [6:0] are shown input from the right at reference number 802 and instruction X's source/destination bits [6:0] are shown input from the top at reference number 804. The most scant bit (MSB) is bit 6 and the least significant bit (LSB) is bit 0. The corresponding bits from the two operands are fed to a set of seven exclusive NOR gates (XNORS) 806. The outputs of XNORs 806 are then ANDed by a seven input AND gate 808. If the corresponding bits are the same, the output of XNOR 806 will be logic high. When all bits are the same, all seven XNOR 806 outputs are logic high and the output of AND gate 808 is logic high, this indicates that there is a dependency between IXS/D and IYS/D.

The random logic for comparator blocks 702 and 704 will be identical to that shown in FIG. 8. The present invention contemplates many other random logic circuits for performing data dependency checking, as will become evident to those skilled in the art without departing from the spirit of this example.

As will further become evident to those skilled in the art, various implementation-specific special cases can arise which require additional random logic to perform data dependency checking. An illustrative special data dependency checking case is for long word handling.

As mentioned before, if a long word operation writes to register X, the first 32 bits are written to register X and the second 32 bits are written to register X+1. The data dependency checker therefore needs to check both registers when doing a comparison. In a preferred embodiment, register X is an even register, X+1 is an odd register and thus they only differ by the LSB. The easiest way to check both registers at the same time is to simply ignore the LSB. In the case of a store long (STLG) or load long (LDLG) operation, if X and Y only differ by the LSB bit [0], the logic in FIG. 8 would cause there to be no dependency, when there really is a dependency. Therefore, for a long word operation the STLG and LDLG flags must be ORed with the output of the [0] bit XNOR to assure that all dependencies are detected.

Figure 5:
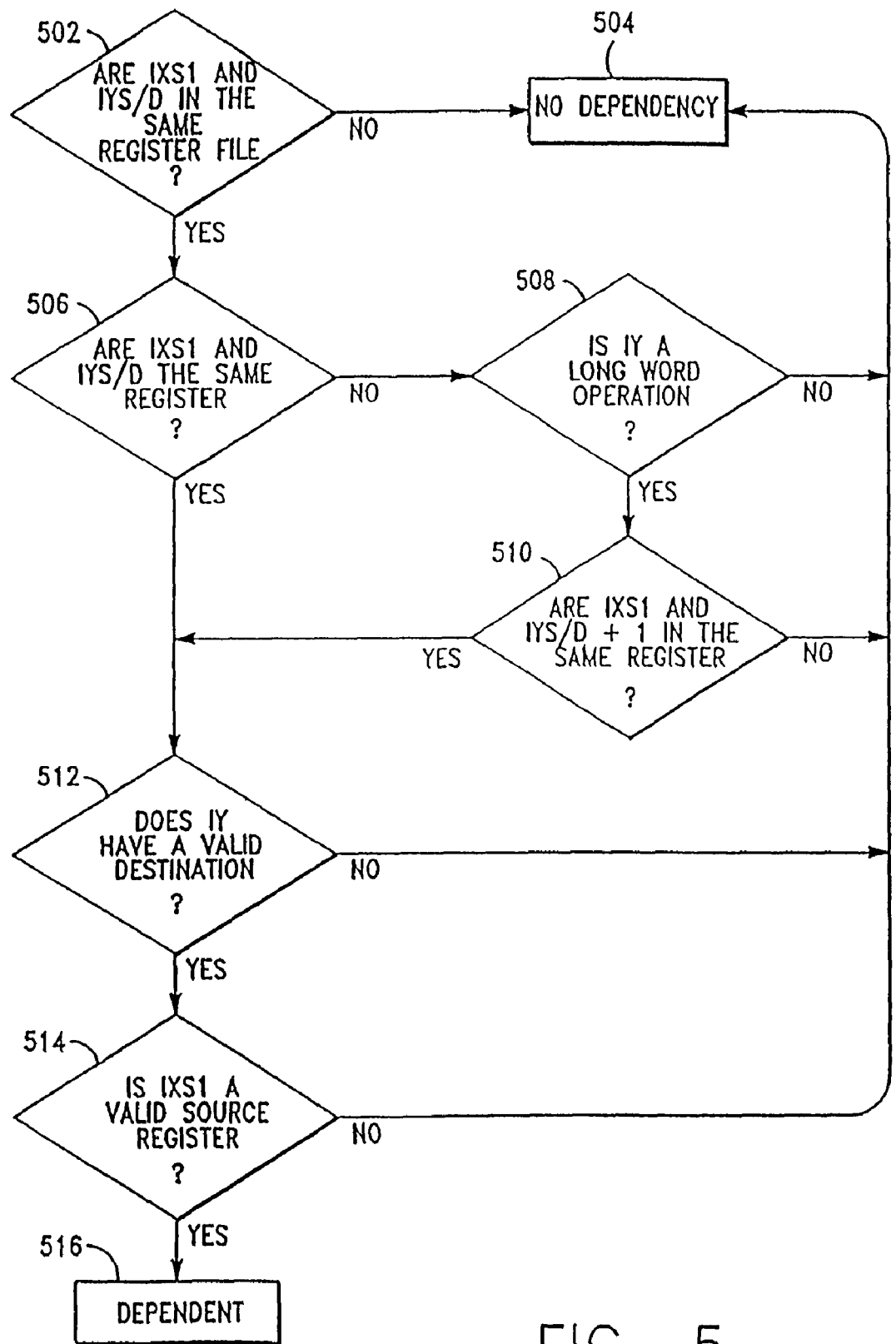
FIG. 5 is a representative flowchart showing a data dependency check method for IXS1 and IYS/D in accordance with the present invention.

A data dependency check flowchart for IXS1 and TYS/D is shown in FIG. 5. DDC 108 first checks whether IXS1 and IYS/D are in the same register file, as shown at a conditional block 502. If they are not in the same register file there is no dependency. This is shown at a block 504. If there is a dependency, DDC 108 then determines whether IXS1 and IYS/D are in the same register, as shown at a block 506. If they are not in the same register, flow proceeds to a conditional block 508 where DDC 108 determines whether IY is a long word operation. If IY is not a long word operation there is no dependency and flow proceeds to a block 504. If IY is a long word operation, flow then proceeds to a conditional statement 510 where DDC 108 determines whether IXS1 and IYS/D+1 are the same register. If they are not, there is no dependency and flow proceeds to a block 504. If IXS1 and IYS/D+1 are the same register, flow proceeds to a conditional block 512 where DDC 108 determines if IY has a valid destination. If it does not have a valid destination, there is no dependency and flow proceeds to block 504. If IY does have a valid destination, flow proceeds to a conditional block 514 where DDC 108 determines if IXS1 has a valid source register. Again, if no valid source register is detected there is no dependency, and flow proceeds to a block 504. If a valid source register is detected, DDC 108 has determined that there is a dependency between IXS1 and IYX/D, as shown at a block 516.

A more detailed discussion of data dependency checking is found in commonly owned, copending application Ser. No. 07/860,718, the disclosure of which is incorporated herein by reference.

Because it is possible that an instruction might get one of its inputs from a register that was written to by several other instructions, the present invention must choose which one is the real dependency. For example, if instructions 2 and 5 write to register 4 and instruction 7 reads register 4, then instruction 7 has two possible dependencies. In this case, it is assumed that since instruction 5 came after instruction 2 in the program, the programmer intended instruction 7 to use instruction 5's result and not instruction 2's. So, if an instruction can be dependent on several previous instructions, RRC 112 will consider it to be dependent on the highest numbered previous instruction.

Once TAL 122 has determined where the real dependencies are, it must locate the inputs for each instruction. In a preferred embodiment of the present invention, the inputs can come from the actual register file or an array of temporary buffers 116. RRC 112 assumes that if an instruction has no dependencies, its inputs are all in the register file. In this case, RRC 112 passes the IXS1, IXS2 and IXS/D addresses that came from IFIFO 102 to the register file. If an instruction has a dependency, then RRC 112 assumes that the data is in temporary buffers 116. Since RRC 112 knows which previous instruction each instruction depends on, and since each instruction always writes to the same place in temporary buffers 116, RRC 112 can determine where in temporary buffers 116 an instruction's inputs are stored. It sends these addresses to register file read ports 119 and register file 117 outputs the data from temporary buffers 116 so that the instruction can use it.

The following is an example of tag assignments:

0: add r0, r2, r2

1: add r0, r2, r3

2: add r4, r5, r2

3: add r2, r3, r4

The following are the dependencies for the above operations (dependencies are represented by the symbol "#"):

I1S2#I0S/D

I3S1#I0S/D

I3S1#I2S/D

I3S2#I1S/D

First, look at I0; since it has no dependencies, its tags are equal to its original source register addresses:

I0S1 TAG=I0S1=r0

I0S2 TAG=I0S2=r1

I0S/D TAG=I0S/D=r2

I1 has one dependency, and its tags are as follows:

I1S1 TAG=I1S1=r0

*I1S2* TAG=*I0S/D*=t0 where: (t0=inst. 0's slot in temporary buffer)

*I1S/D* TAG=*I1S/D*=r3

I2 is also independent

I2S1 TAG=I2S1=r4

I2S2 TAG=I2S2=r5

*I2S/D* TAG=*I2S/D*=r2

I3S1 has two possible dependencies, I0S/D and I2SD. Because TAL 122 must pick the last one (highest numbered one), I2S/D is chosen.

*I3S1* TAG=*I2S/D*=t2

*I3S2* TAG=*I1S/D*=t1

*I3S/D* TAG=*I3S/D*=r4

These tags are then sent to RPM 124 via bus 126 to be selected by Issuer 118. At the same time TAL 122 is preparing the tags, it is also monitoring the outputs of DCL 130 and passing them on to Issuer 118 using bus 120. TAL 122 chooses the proper outputs of DCL's 130 to pass to Issuer 118 by the same method that it chooses the tags that it sends to RPM 124.

Continuing the example, TAL 122 sends the following ready signals to Issuer 118:

I0S1 INFO=1

(Inst 0 is independent so it can start immediately)

I0S2 INFO=1

I0*S/D* INFO=1

I1S1 INFO=1

I1S2 INFO=DONE[0]

(DONE[0]=1 when I0 is done)

*I1S/D* INFO=1

I2S1 INFO=1

I2S2 INFO=1

*I2S/D* INFO=1

I3S1 INFO=DONE[2]

I3S2 INFO=DONE[1]

*I3S/D* READ=1

(The DONE signals come from DCL 130 via a bus 132. In connection with the present invention, the term "done" means the result of the instruction is in a temporary buffer or otherwise available at the output of a functional unit. Contrastingly, the term "terminate" means the result of the instruction is in the register file.)

Figure 3:
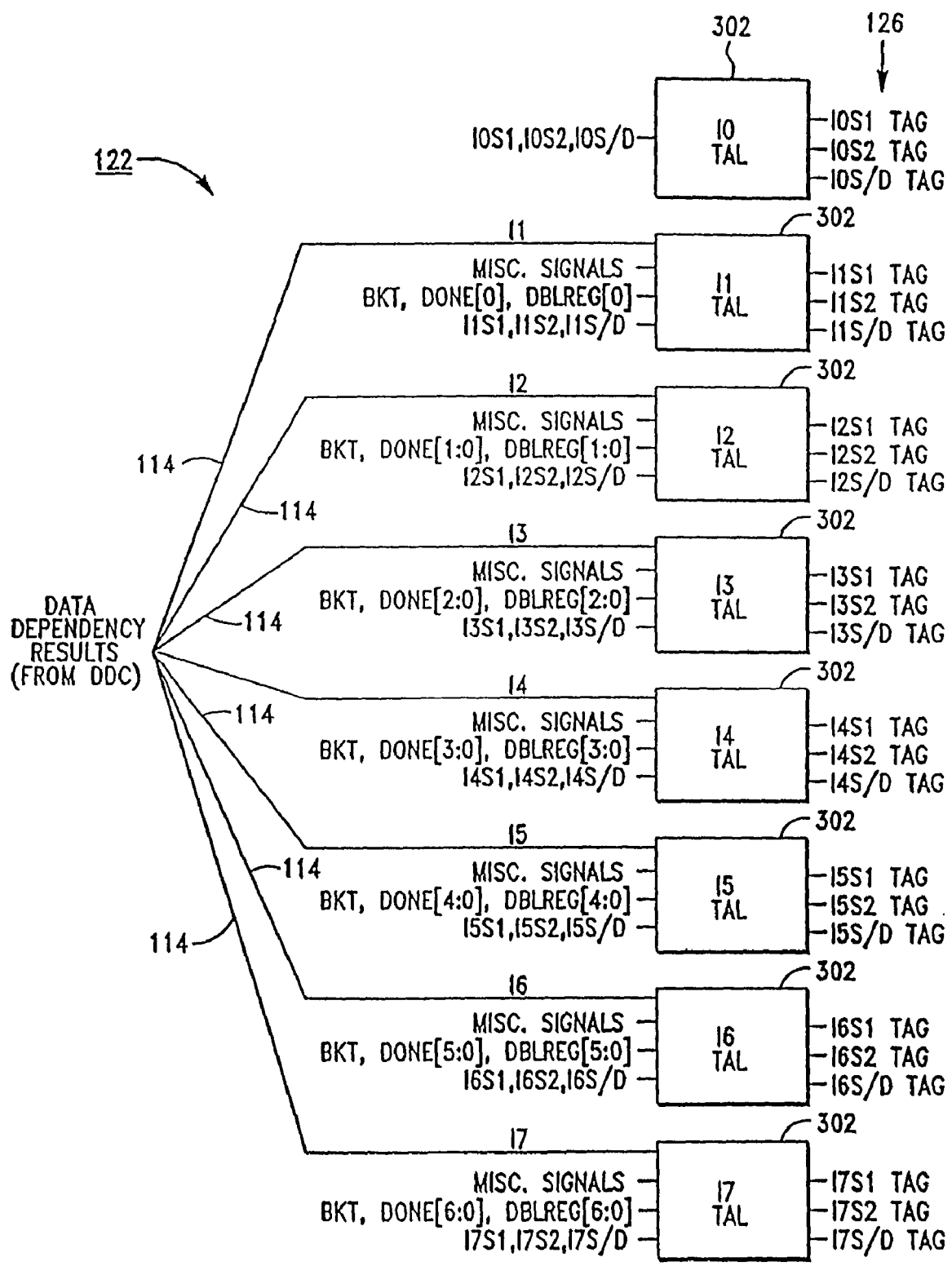
FIG. 3 shows a representative block diagram of the tag assignment logic of the present invention.

Turning now to FIG. 3, a representative block diagram of TAL 122 will be discussed. TAL 122 comprises 8 tag assignment logic blocks 302. Each TAL block 302 receives the corresponding data dependency results via buses 114, as well as further signals that come from the computer's Instruction Decode and control logic (not shown). The BKT bit signal forms the least significant bit of the tag. DONE[X] flags are for instructions 0 through 6, and indicate if instruction X is done. DBLREG[X] flags indicates which, if any, of the instructions is a double (long) word. Each TAL block 302 also receives its own instructions register addresses as inputs. The Misc. signals, DBLREG and BKT signals are all implementation dependent control signals. Each TAL block 302 outputs 3 TAGs 126 labeled IXS1, IXS2 and IXS/D, which are 6 bits. TAL 122 outputs the least significant 5 bits of each TAG signal to RPMs 124 and the most significant TAG to Issuer 118.

Each block 302 of FIG. 3 comprises three Priority Encoders (PE), one for S1, one for S2 and one for S/D. There is one exception however. I0 requires no tag assignment. Its tags are the same as the original S1, S2 and S/D addresses, because I0 is always independent.

Figure 9:
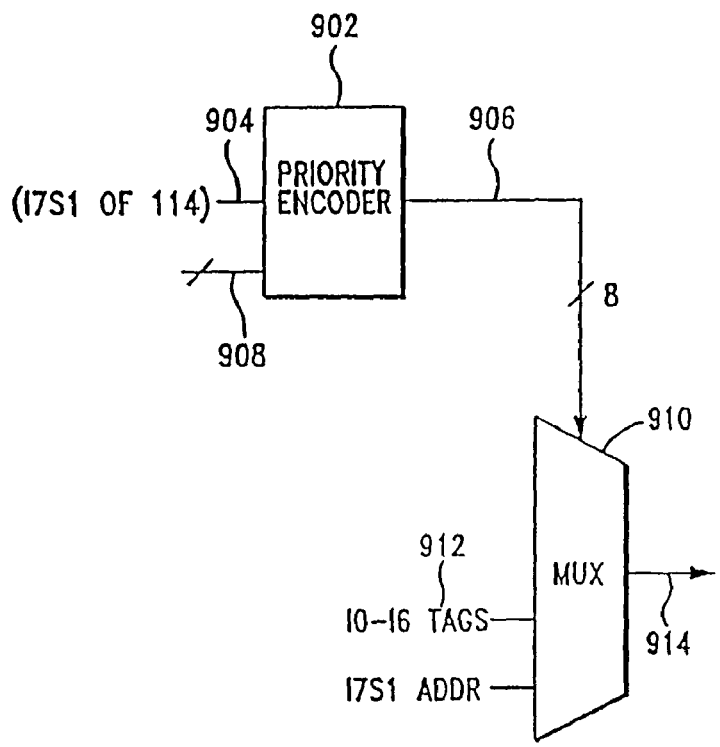
FIG. 9 shows a representative block diagram of a Priority Encoder in accordance with an embodiment of the present invention.

An illustrative PE is shown in FIG. 9. PE 902 has eight inputs 904 and eight outputs 906. Inputs 904 for PE 902 are outputs 114 from DDC 108 which show where dependencies exist. For example, in the case of source register 1 (S1), I7S1 tag assign PE 902's seven inputs are the seven outputs 114 of DDC 108 that indicate whether I7S1 is dependent on I6D, whether I7S1 is dependent on I5D, and so on down to whether I7S1 is dependent on I0D. An eighth input, shown at reference number 908, is always tied high because there should always be an output from PE 902.

As stated before, if an instruction depends on several previous instructions, PE 902 will select and output only the most previous instruction (in program order) on which there is a dependency. This is accomplished by connecting the signal showing if there is a dependency on the most previous instruction to the highest priority input of the PE 902 and the signal showing if there is a dependency on the second most previous instruction to the input of PE 902 with the second highest priority and so on for all previous instructions. The input of the PE 902 with the lowest priority is always tied high so that at least one of PE 902's outputs will be asserted.

Outputs 906 are used as select lines for a MUX 910. MUX 910 has eight inputs 912 to which the tags for each instruction are applied.

To illustrate this, assume that I7 depends on I6 and I5; then, since I6 has a higher priority than I5, the bit corresponding to I6 at outputs 906 of PE 902 will be high. At the corresponding input 912 of MUX 910 will be I6's tag for S1 (recall PE 902 is for I7S1). Because I7 is dependent on I6, the location of I6's result must be output from MUX 910 so that it can be used by I7. I6's tag will therefore be selected and output on an output line 914. I6's done flag, DONE[6] must also be output from MUX 910 so that Issuer 118 will know when I7's input is ready. This data is passed to Issuer 118 via bus 120. Since an instruction can have up to three sources, TAL 122 monitors up to three dependencies for each instruction and sends three vectors for each instruction (totaling 24 vectors) to Issuer 118. If an instruction is independent, TAL 122 signals to Issuer 118 that the instruction can begin immediately.

The MSB of the tag outputs which are sent to RPMs 124 is used to indicate if the address is a register file address or a temporary buffer address. If an instruction is independent, then the five LSB outputs indicate the source register address. For instructions that have dependencies: the second MSB indicates that the address is for a 64 bit value; the third through fifth MSB outputs specify the temporary buffer address; and the LSB output indicates which bucket is the current bucket, which is equal to the BKT signal in TAL 122.

Like DDC 108, TAL 122 has numerous implementation dependent, (i.e., special cases) that it handles. First, in an embodiment of the present invention, register number 0 of the register file is always equal to 0. Therefore, even if one instruction writes to register 0 and another reads from register 0, there will be no dependency between them. TAL 122 receives three signals from Instruction Decode Logic (IDL; not shown) for each instruction to indicate if one of that instruction's sources is register 0. If any of those is asserted, TAL 122 will ignore any dependencies for that particular input of that instruction.

Another special case occurs because under some circumstances, an instruction in bucket 0 will be guaranteed to not have any of the instructions in bucket 1 dependent on it. A four bit signal called BKT1_NODEP_ is sent to RRC 112 from the IEU control logic (not shown) and if BKT1_NODEP[X]=1 then RRC 112 knows to ignore any dependencies between instructions 4,5,6 or 7 and instruction X.

Figure 6B:
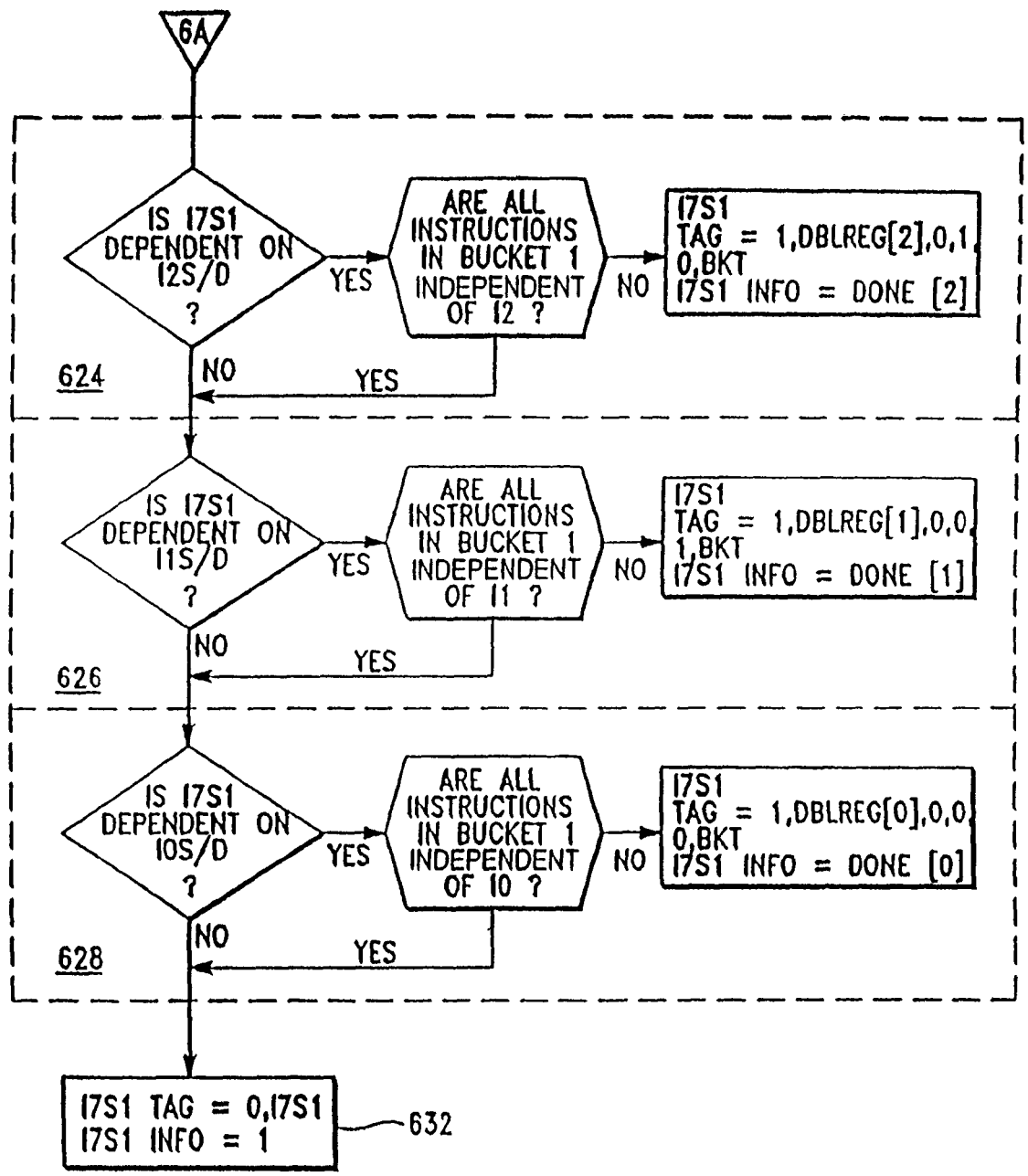

An example for TAG assignment of instruction 7's source 1 (I7S1) is shown in a flowchart in FIGS. 6A-6B. TAL 122 first determines whether I7S1 is register 0, as shown at a conditional block 602. If the first source operand for I7 is register 0, the TAG is set equal to zero, and the I7S1's INFO flag is set equal to one, as shown in a block 604. If the first source operand (S1) for I7 is not register 0, TAL 122 then determines if I7S1 is dependent on I6S/D, as shown at a conditional block 606. If I7S1 is dependent on I6S/D, flow then proceeds to a block 610 where I7S1's TAG is set equal to {1,DBLREG[6],0,1,0,BKT} and I7S1's INFO flag is set equal to DONE[6], as shown at a block 610. If either of the condition tested at a conditional block 606 is not met, flow proceeds to conditional block 612 where TAL 122 determines if I7S1 is dependent on I5S/D. If there is a dependency, flow then proceeds to block 616 where TAL 122 sets I7S1's TAG equal to {1,DBLREG[5],0,0,1,BKT} and I7S1's INFO flag is set equal to DONE[5]. If the condition tested at block 612 is not met, flow proceeds to a block 618 where TAL 122 determines if I7S1 is dependent on I4S/D.

1 As evident by inspection of the remaining sections of FIGS. 6A and 6B, similar TAG determinations are made depending on whether I7S1 is dependent on I4S/D, I3S/D, I2S/D, I1S/D and I0S/D, as shown at sections 620, 622, 624, 626 and 628, respectively. Finally, if instruction 7 is independent of instruction 0 or if all instructions in bucket 1 are independent of instruction 0 (i.e., if BKI1_NODEP[0]=1), as tested at a conditional block 630, the flow proceeds to block 632 where TAL 122 sets I7S1's TAG equal to {0, I7S1} and I7S1's INFO flag equal to 1. It should be noted for the above example that I7S1 TAG signals are forwarded directly the register file port MUXes of register file 117. The I7S1 INFO signals are sent to Issuer 118 to tell it when I7's S1 input is ready.

Figure 10:
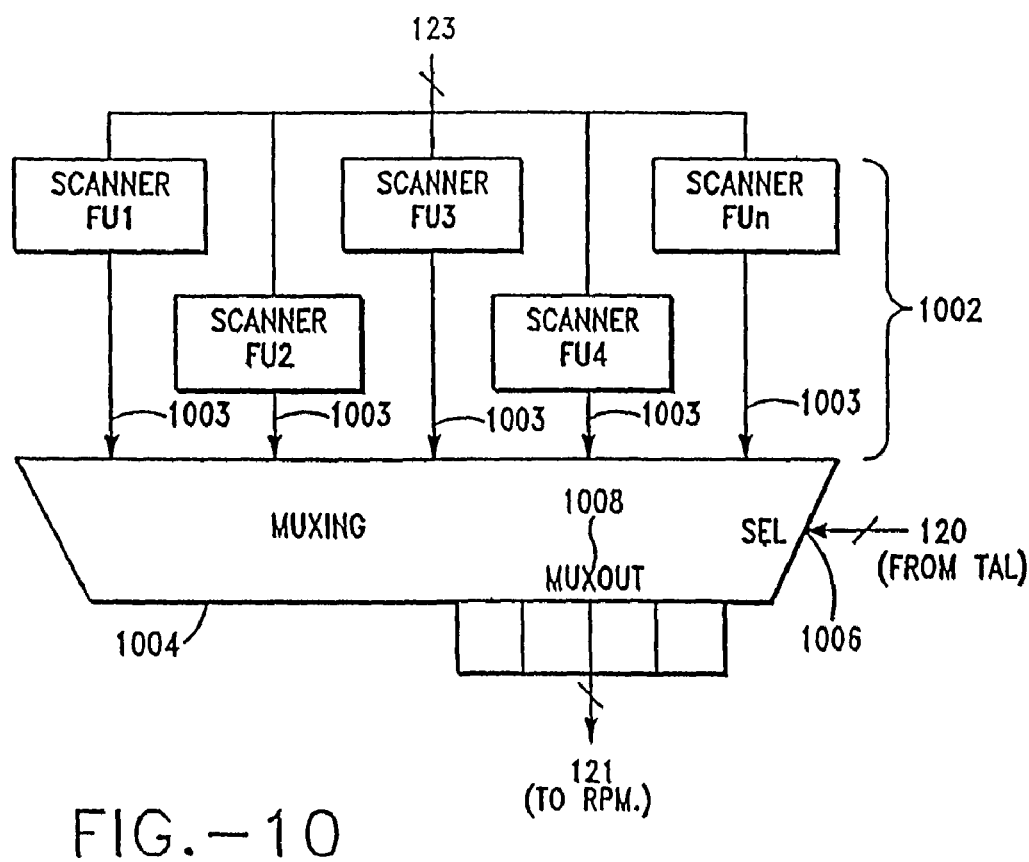
FIG. 10 shows a representative block diagram of the instruction scheduling logic of the present invention.

A representative block diagram of Issuer 118 is shown in FIG. 10. In a preferred embodiment, Issuer 118 has one scanner block 1002 for each resource (functional unit) that has to be allocated. In this example, Issuer 118 has scanner blocks FU1, FU2, FU3, FU4 through FUn. Requests for functional units are generated from instruction information by decoding logic (not shown) in a known manner, which are sent to scanners 1002 via bus 123. Each scanner block 1002 scans from instruction I0 to I7 and selects the first request for the corresponding functional unit to be serviced during that cycle.

In the case of multiple register files (integer, floating and/or boolean), Issuer 118 is capable of issuing instructions having operands stored in different register files. For example, an ADD instruction may have a first operand from the floating point register file and a second operand from the integer register file. Instructions with operands from different register files are typically given higher issue priority (i.e., they are issued first). This issuing technique conserves processor execution time and functional unit resources.

In a further embodiment in which IEU 100 may include two ALU's, ALU scanning becomes a bit more complicated. For speed reasons, one ALU scanner block scans from I0 to I7, while the other scanner block scans from I7 to I0. This is how two ALU requests are selected. With this scheme it is possible that an ALU instruction in bucket 1 will get issued before an ALU instruction in bucket 0, while increasing scanning efficiency.

Scanner outputs 1003 are selected by MUXing logic 1004. A set of SELect inputs 1006 for MUX 1004 receive three 8-bit vectors (one for each operand) from TAL 122 via bus 120. The vectors indicate which of the eight instructions have no dependencies and are ready to be issued. Issuer 118 must wait for this information before it can start to issue any instructions. Issuer 118 monitors these vectors and when all three go high for a particular instruction, Issuer 118 knows that the inputs for that instruction are ready. Once the necessary functional unit is ready, the issuer can issue that instruction and send select signals to the register file port MUXes to pass the corresponding instructions outputs to register file 117.

In a preferred embodiment of the present invention, after Issuer 118 is done it provides two 8-bit vectors per register file back to RRC 112 via MUXOUTputs 1008 to bus 121. These vectors indicate which instructions are issued this cycle, are used a select lines for RPMs 124.

The maximum number of instructions that can be issued simultaneously for each register file is restricted by the number of register file read ports available. A data dependency with a previous uncompleted instruction may prevent an instruction from being issued. In addition, an instruction may be prevented from being issued if the necessary functional unit is allocated to another instruction.

Several instructions, such as load immediate instructions, Boolean operations and relative conditional branches, may be issued independently, because they may not require resources other than register file read ports or they may potentially have no dependencies.

The last section of RRC 112 is the register file port MUX (RPM) section 124. The function of RPMs 124 is to provide a way for Issuer 118 to get data out of register files 117 for each instruction to use. RPMs 124 receive tag information via bus 126, and the select lines for RPMs 124 come from Issuer 118 via a bus 121 and also from the computer's IEU control logic. The selected TAGs comprise read addresses that are sent to a predetermined set of ports 119 of register file 117 using bus 128.

Figure 4:
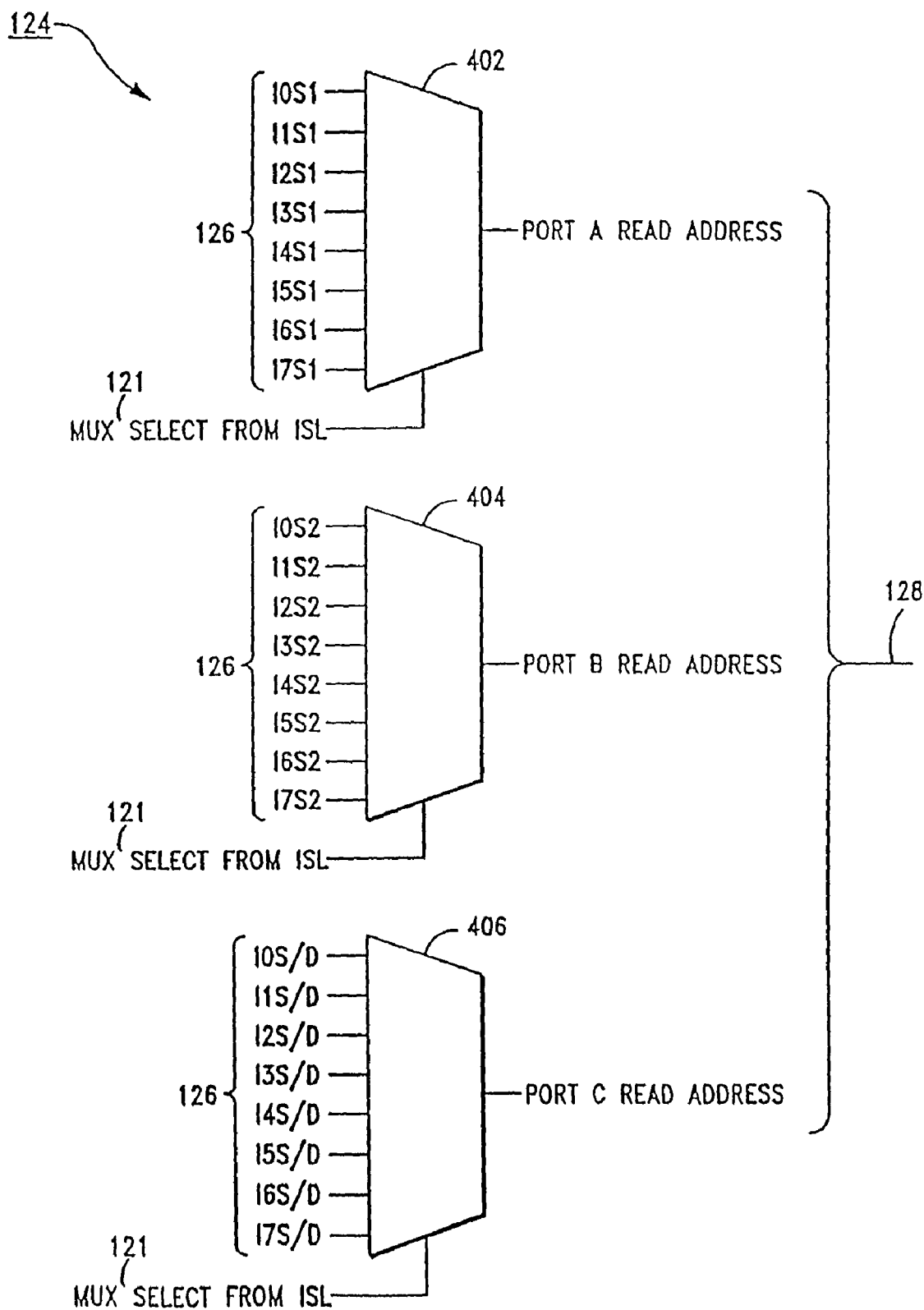
FIG. 4 shows a representative block diagram of the register port file multiplexers of the present invention.

The number and design of RPMs 124 depend on the number of register files and the number of ports on each register file. One embodiment of RPMs 124 is shown in FIG. 4. In this embodiment, RPMs 124 comprises 3 register port file MUXes 402, 404 and 406. MUX 402 receives as inputs the TAGs of instructions 0-7 corresponding to the source register field S1 that are generated by TAL 122. MUX 404 receives as inputs the TAGs of instructions 0-7 corresponding to the source register field S2 that are generated by TAL 122. MUX 406 receives as inputs the TAGs of instructions 0-7 corresponding to the source/destination register field S/D that are generated by TAL 122. The outputs of MUXes 402, 404 and 406 are connected to the read addresses ports of register file 117 via bus 128.

RRC 112 and Issuer 118 allow the processor to execute instructions simultaneously and out of program order. An IEU for use with the present invention is disclosed in commonly owned, co-pending application Ser. No. 07/817,810 the disclosure of which is incorporated herein by reference.

While Various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A system, comprising:
 a data-dependency checker configured to provide data-dependency results indicating a dependency between one or more instructions in an instruction window; and
 tag-assignment logic configured to receive the data-dependency results from the data-dependency checker and to output a tag in place of a register address for an operand of a first instruction if the first instruction is dependent on a previous instruction in the instruction window, wherein the tag comprises an address of the operand.

2. The system of claim 1, further comprising:
 a plurality of multiplexers configured to transfer execution results from storage locations in a temporary buffer to register-file locations in-order based on an order of instructions in the instruction window.

3. The system of claim 2, wherein the plurality of multiplexers simultaneously transfer a group of execution results from the temporary buffer to the register-file locations.

4. The system of claim 2, wherein the plurality of multiplexers transfers an execution result for an instruction of a group of instructions in the instruction window from the temporary buffer to the register file when all execution results for all prior instructions of the group of instructions are retirable.

5. The system of claim 1, wherein the tag further comprises a 1-bit identifier that indicates whether the address within the tag is a register-file address or a temporary-buffer address.

6. The system of claim 1, wherein the data-dependency checker is further configured to compare a source-register address of each instruction in the instruction window to a destination-register address of each previous instruction in the instruction window.

7. A computer system, comprising:
 a memory unit configured to store instructions;
 a bus coupled to the memory unit and configured to retrieve the instructions; and
 a processor coupled to the bus, wherein the processor comprises a register-renaming system, comprising:
  a data-dependency checker configured to provide data-dependency results indicating a dependency between one or more instructions in an instruction window; and
  tag-assignment logic configured to receive the data-dependency results from the data-dependency checker and to output a tag in place of a register address for an operand of a first instruction if the first instruction is dependent on a previous instruction in the instruction window, wherein the tag comprises an address of the operand.

8. The computer system of claim 7, wherein the processor further comprises:
 a plurality of multiplexers configured to transfer execution results from storage locations in a temporary buffer to register-file locations in-order based on an order of instructions in the instruction window.

9. The computer system of claim 8, wherein the plurality of multiplexers simultaneously transfer a group of execution results from the temporary buffer to the register-file locations.

10. The computer system of claim 8, wherein the plurality of multiplexers transfers an execution result for an instruction of a group of instructions in the instruction window from the temporary buffer to the register file when all execution results for all prior instructions of the group of instructions are retirable.

11. The computer system of claim 7, wherein the tag further comprises a 1-bit identifier that indicates whether the address within the tag is a register-file address or a temporary-buffer address.

12. The computer system of claim 7, wherein the data-dependency checker is further configured to compare a source-register address of each instruction in the instruction window to a destination-register address of each previous instruction in the instruction window.

13. A register-renaming method, comprising:
 providing data-dependency results that indicate a dependency between one or more instructions in an instruction window; and
 outputting a tag in place of a register address for an operand of a first instruction if the first instruction is dependent, as indicated by the data-dependency results, on a previous instruction in the instruction window, wherein the tag comprises an address of the operand.

14. The register-renaming method of claim 13, further comprising:
 transferring execution results from storage locations in a temporary buffer to register-file locations in-order based on an order of instructions in the instruction window.

15. The register-renaming method of claim 14, wherein the transferring execution results from storage locations in a temporary buffer to register-file locations in-order based on an order of instructions in the instruction window comprises:

simultaneously transferring a group of execution results from the temporary buffer to the register-file locations.

16. The register-renaming method of claim 14, wherein the transferring execution results from storage locations in a temporary buffer to register-file locations in-order based on an order of instructions in the instruction window comprises:

transferring an execution result for an instruction of a group of instructions in the instruction window from the temporary buffer to the register file when all execution results for all prior instructions of the group of instructions are retirable.

17. The register-renaming method of claim 13, wherein the tag further comprises a 1-bit identifier that indicates whether the address within the tag is a register-file address or a temporary-buffer address.

18. The register-renaming method of claim 13, wherein the providing data-dependency results that indicate any dependencies between instructions in an instruction window further comprises:

comparing a source-register address of each instruction in the instruction window to a destination-register address of each previous instruction in the instruction window.

* * * * *